United States Patent [19]

Appell et al.

[11] 4,177,510

[45] Dec. 4, 1979

[54] PROTECTION OF DATA IN AN INFORMATION MULTIPROCESSING SYSTEM BY IMPLEMENTING A CONCEPT OF RINGS TO REPRESENT THE DIFFERENT LEVELS OF PRIVILEGES AMONG PROCESSES

[75] Inventors: Marc Appell, Paris; Georges Lepicard, Vaucresson; Philippe-Hubert de Rivet, Paris; John J. Bradley, Garches, all of France; Benjamin S. Franklin, Cambridge, Mass.

[73] Assignee: Compagnie Internationale pour l'Informatique, CII Honeywell Bull, Paris, France

[21] Appl. No.: 528,953

[22] Filed: Dec. 2, 1974

[30] Foreign Application Priority Data

Nov. 30, 1973 [FR] France .................. 73 42706

[51] Int. Cl.² .................. G06F 9/18; G06F 9/20
[52] U.S. Cl. .................. 364/200
[58] Field of Search .................. 340/172.5; 445/1; 364/200 MS File, 900 MS File

[56] References Cited

U.S. PATENT DOCUMENTS

| | | | |
|---|---|---|---|
| 3,264,615 | 8/1966 | Case et al. | 364/200 |
| 3,340,539 | 9/1967 | Sims et al. | 364/200 |
| 3,377,624 | 4/1968 | Nelson et al. | 364/200 |
| 3,504,349 | 3/1970 | Wallis | 340/172.5 |
| 3,528,062 | 9/1970 | Lehman et al. | 364/200 |
| 3,562,717 | 2/1971 | Harmon et al. | 340/172.5 |
| 3,573,855 | 4/1971 | Cragon | 364/200 |
| 3,593,300 | 7/1971 | Driscoll et al. | 340/172.5 |
| 3,614,740 | 10/1971 | Delagi et al. | 340/172.5 |
| 3,675,209 | 7/1972 | Trost et al. | 340/172.5 |
| 3,693,165 | 9/1972 | Reiley et al. | 340/172.5 |
| 3,725,874 | 4/1973 | Van Heel | 364/200 |
| 3,727,192 | 4/1973 | Cheney et al. | 340/172.5 |
| 3,742,458 | 6/1973 | Inoue et al. | 364/200 |
| 3,771,146 | 11/1973 | Cotton et al. | 364/200 |
| 3,787,813 | 1/1974 | Coles et al. | 364/200 |
| 3,803,559 | 4/1974 | Bandoo et al. | 364/200 |
| 3,858,182 | 12/1974 | Delagi et al. | 364/200 |
| 3,893,084 | 7/1975 | Kotok et al. | 364/200 |
| 3,916,385 | 10/1975 | Parmar et al. | 364/200 |
| 3,940,745 | 2/1976 | Sajeva | 364/200 |
| 4,017,840 | 4/1977 | Schilde et al. | 364/200 |
| 4,077,058 | 2/1978 | Appell et al. | 364/200 |

Primary Examiner—Gareth D. Shaw
Assistant Examiner—Jan E. Rhoads
Attorney, Agent, or Firm—Diller, Ramik & Wight

[57] ABSTRACT

Computer data and procedure protection by preventing processes from interfering with each other or sharing each other's address space in an unauthorized manner is accomplished in hardware/firmware by restricting addressability to a segmented memory and by a ring protection mechanism.

To protect information in segments shared by several processes from misuse by one of these processes a ring protection hardware system is utilized. There are four ring classes numbered 0 through 3. Each ring represents a level of system privilege with level 0 (the innermost ring) having the most privilege and level 3 (the outermost ring) the least. Every procedure in the system has a minimum and a maximum execute ring number assigned to it which specifies who may legally call the procedure. Also maximum write and read ring numbers specify the maximum ring numbers for which a write and/or read operation is permitted.

Processes use a segmented address during execution wherein segment tables isolate the address space of the various processes in the system. Hardware checks that the address used by a process is part of the address space assigned to the process, and if the address is outside the prescribed address space, an exception occurs. A process cannot refer to data within the address space of another process because the hardware uses the segment table of the referencing process.

11 Claims, 49 Drawing Figures

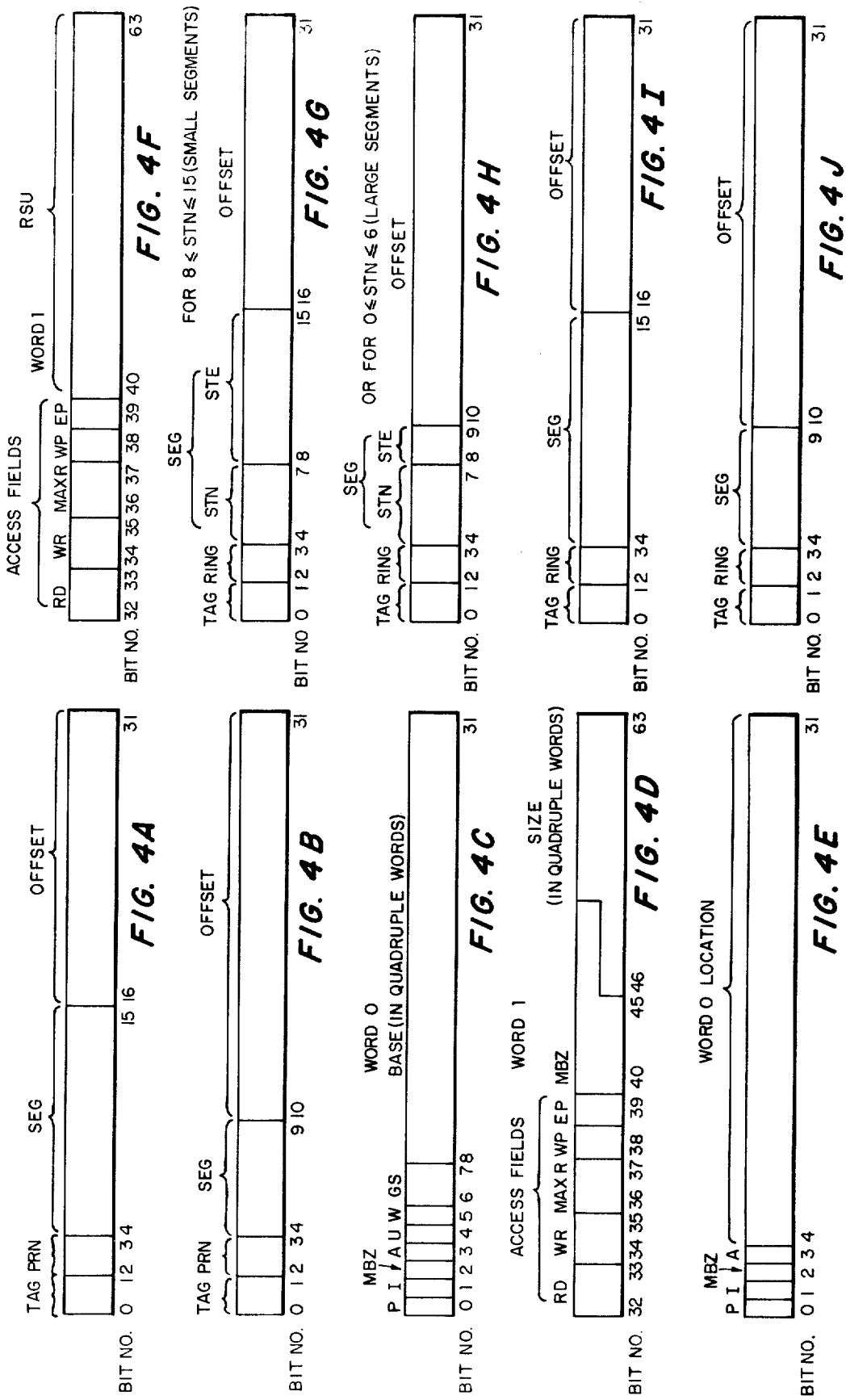

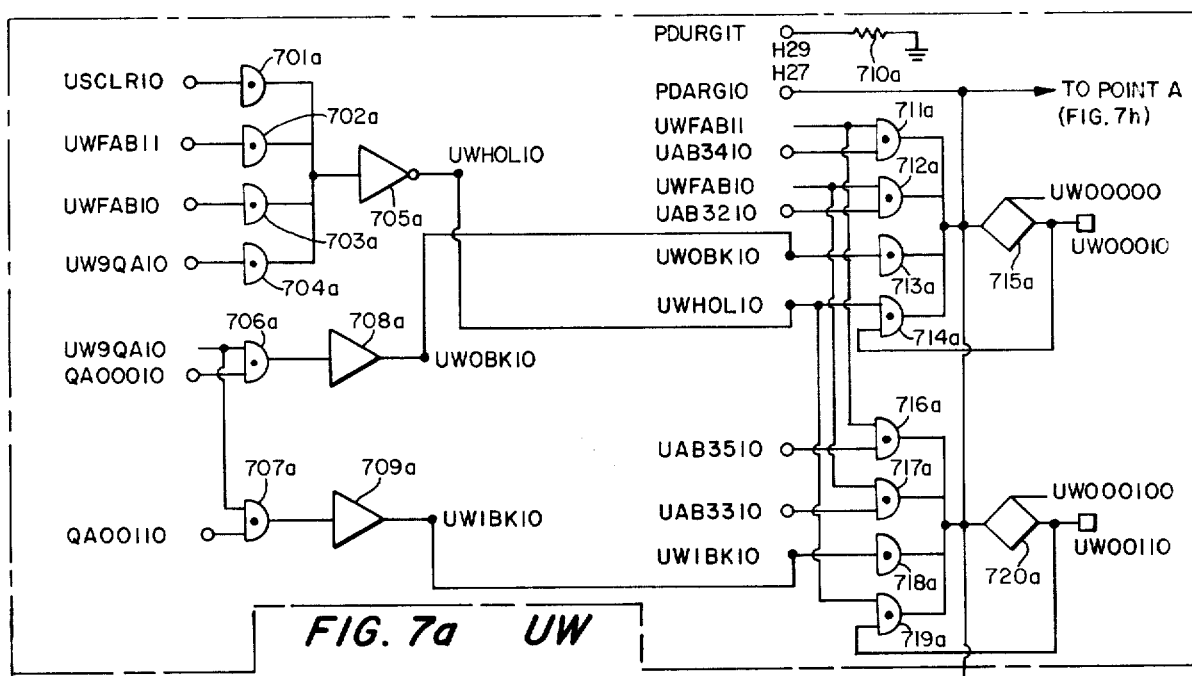
FIG. 7a  UW
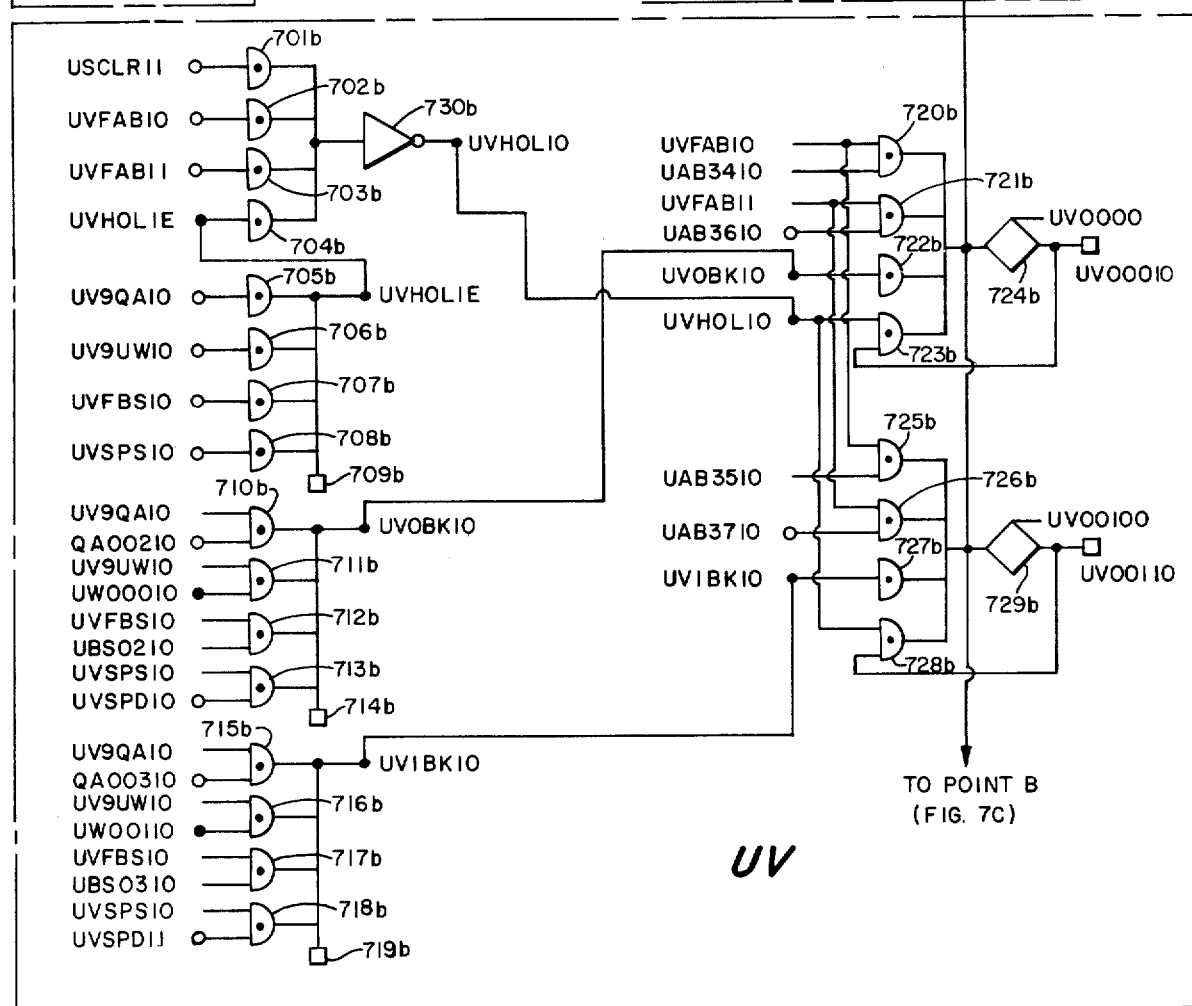
FIG. 7b

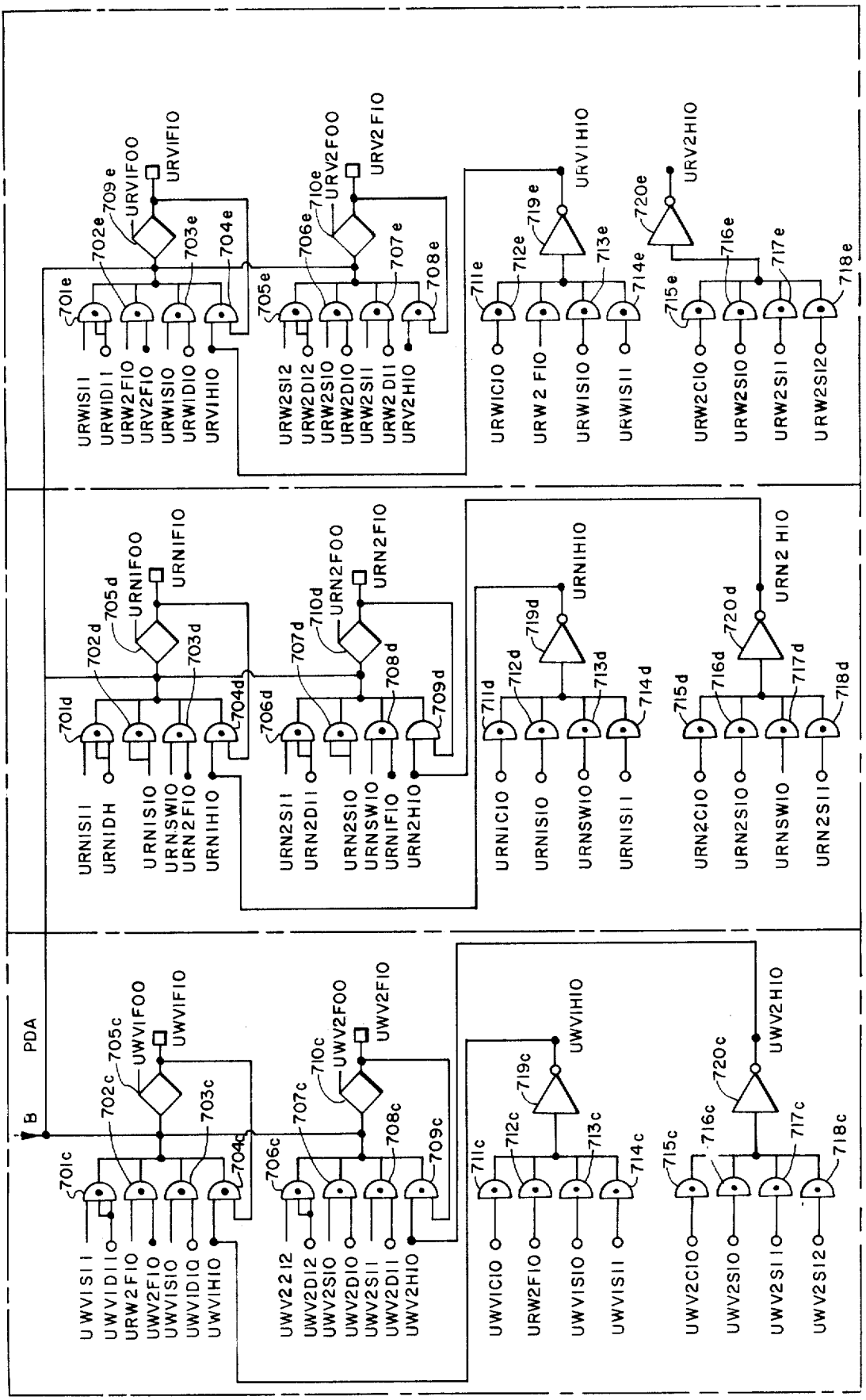

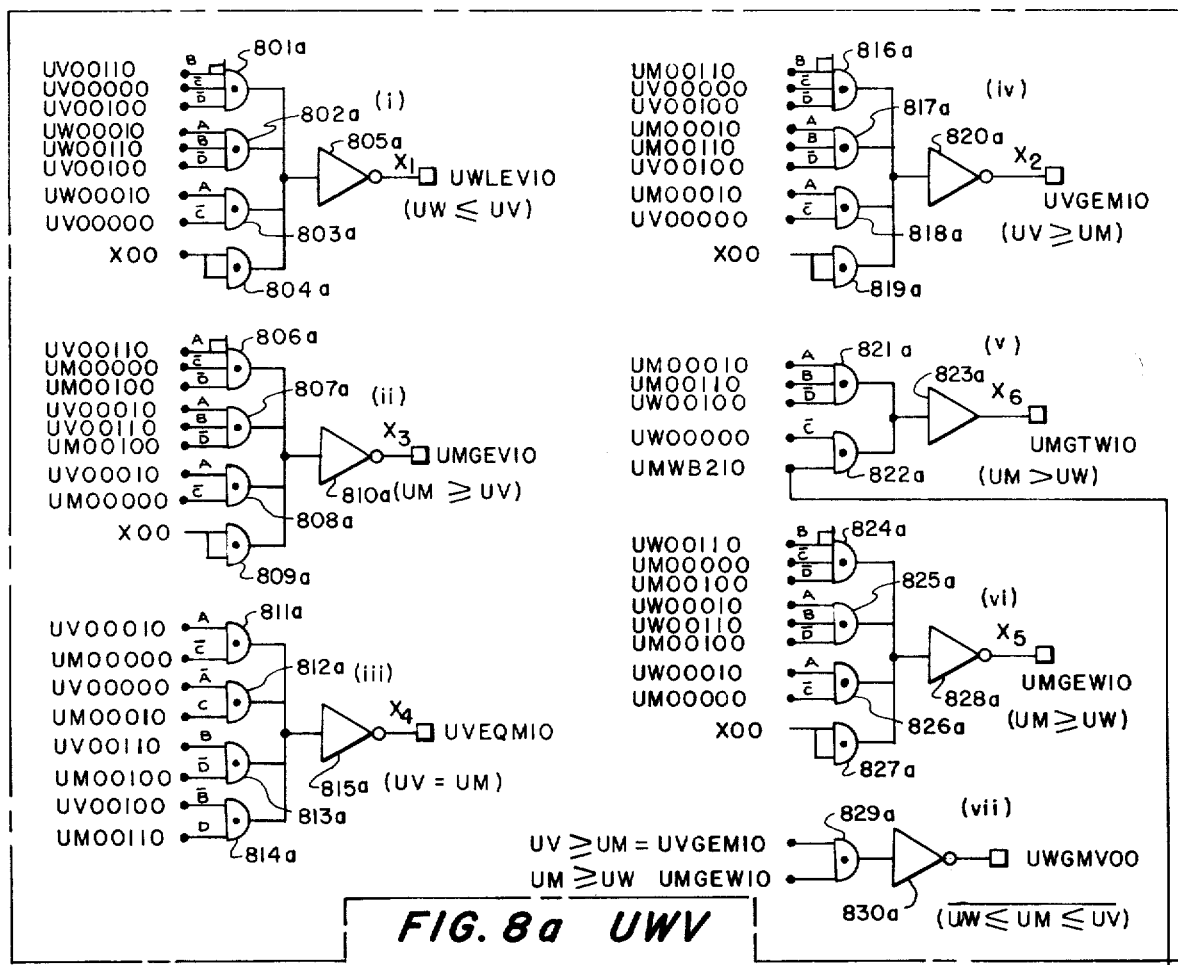
*FIG. 8a UWV*
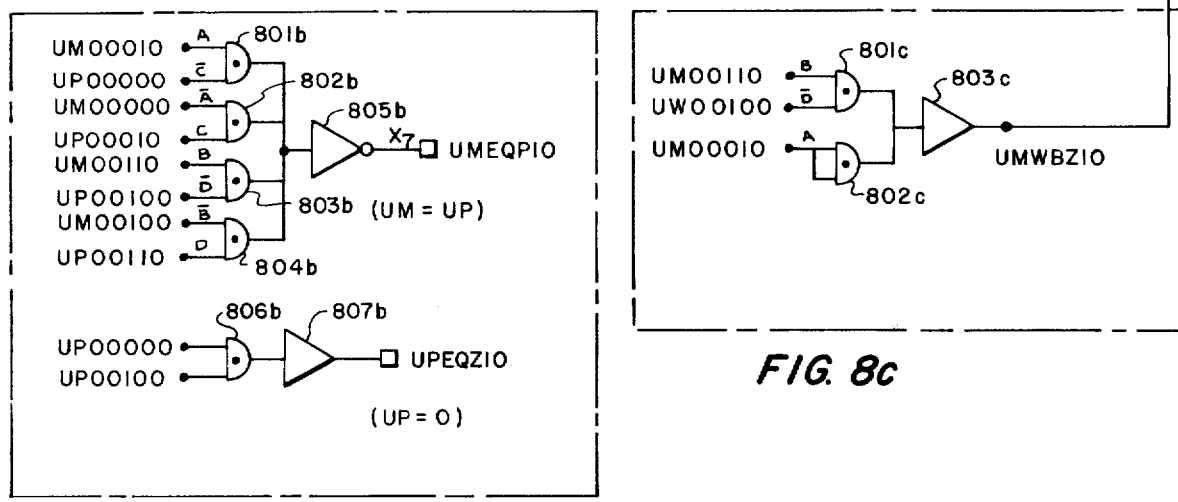
*FIG. 8b UEP*
*FIG. 8c*

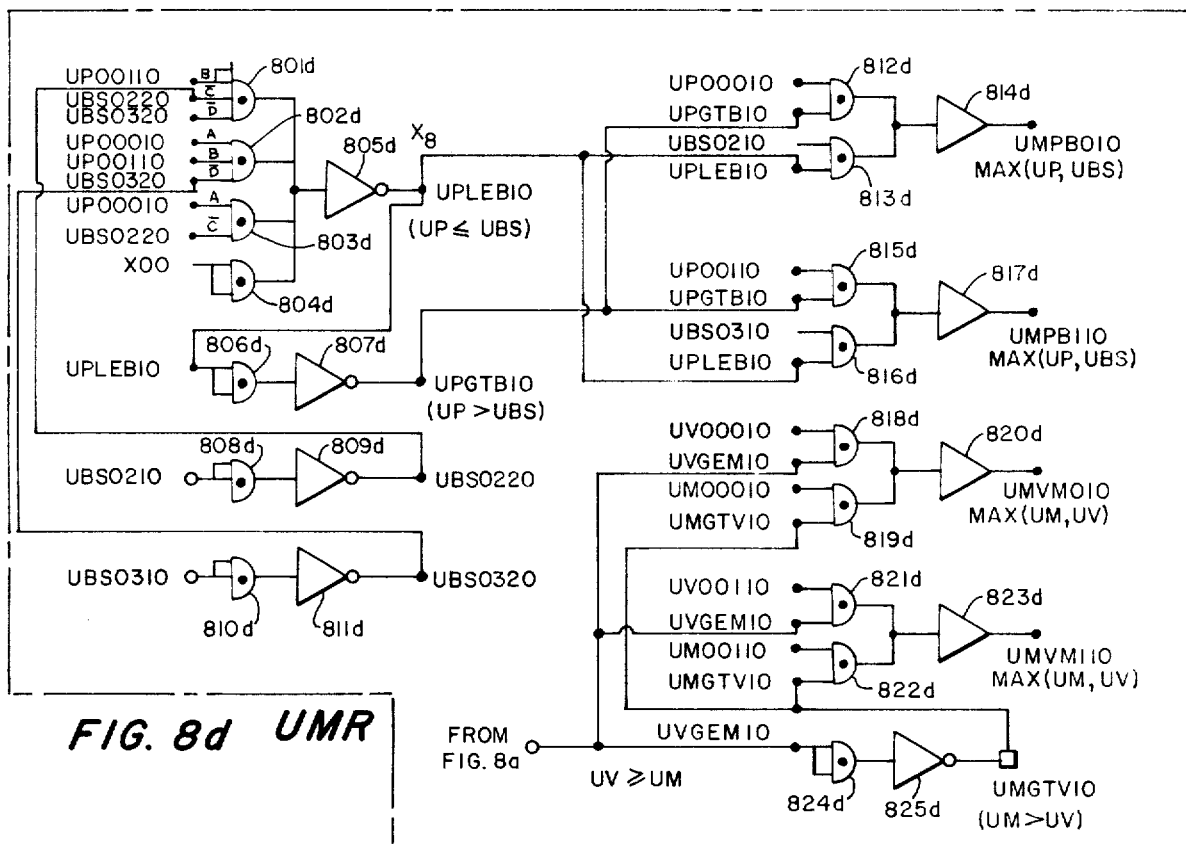
FIG. 8d UMR
FIG. 9a •----- INTERNAL SIGNAL SOURCE
FIG. 9b □----- OUTPUT PIN CONNECTION
FIG. 9c ○----- INPUT PIN CONNECTION
FIG. 9d ⊳----- AND GATE
FIG. 9e ▷----- AMPLIFIER
FIG. 9f ▷∘----- INVERTER
FIG. 9g AND GATES OR'ed TOGETHER
FIG. 9h FLIP-FLOP
FIG. 9i ⊙----- MICRO-OPERATION
FIG. 9j X::Y --- X::Y
FIG. 9k α::β --- STARTING AT BIT α FOR β BIT POSITIONS FROM AND INCLUDING BIT α
*SYMBOL LEGEND*

PROTECTION OF DATA IN AN INFORMATION MULTIPROCESSING SYSTEM BY IMPLEMENTING A CONCEPT OF RINGS TO REPRESENT THE DIFFERENT LEVELS OF PRIVILEGES AMONG PROCESSES

RELATED APPLICATIONS

The following applications are incorporated by reference to the instant application. 1. "Buffer Store" invented by J. L. Curley, T. J. Donahue, W. A. Martland and B. S. Franklin, filed on Oct. 5, 1972 having Ser. No. 295,301 and assigned to the same assignee named herein. 2. "Variable Masking for Segmented Memory" invented by Wallace A. Martland and John L. Curley, filed on Oct. 5, 1972 having Ser. No. 295,303 and assigned to the same assignee named herein. 3. "Override Hardware for Main Store Sequencer" invented by Thomas J. Donahue, filed on Oct. 5, 1972 having Ser. No. 295,418 and assigned to the same assignee named herein. 4. "Main Memory Sequencer" invented by T. J. Donahue, J. L. Curley, B. S. Franklin, W. A. Martland, and L. V. Cornaro, filed on Oct. 5, 1972 having Ser. No. 295,331 and assigned to the same assignee named herein. 5. "Main Memory Reconfiguration" invented by J. L. Curley, B. S. Franklin, W. A. Martland, T. J. Donahue, and L. V. Cornaro filed on Oct. 5, 1972 having Ser. No. 295,417 and assigned to the same assignee named herein. 6. "Procedure Calls and Stack Mechanism", invented by Marc Appell et al., and having Ser. No. 529,019 and assigned to the same assignee named herein, and now abandoned. 7. "Device for Process Synchronization Using Semaphores" invented by Bienvenu et al., filed on Dec. 2, 1974, and having Ser. No. 529,015 and assigned to the same assignee named herein. 8. "P & V Instructions on Semaphores for Process Synchronization" invented by Bienvenu et al., filed on Dec. 2, 1974, and having Ser. No. 529,017 and assigned to the same assignee named herein. 9. "Process Control Block" invented by Biennenu et al., filed on Dec. 2, 1974, and having Ser. No. 528,954 and now abandoned. 10. "System Base" invented by Carre et al., filed on Dec. 2, 1974, and having Ser. No. 528,951 and now abandoned. 11. "Process Management Structures & Hardware Firmware Control" invented by Dufond et al., filed on Dec. 2, 1974 and having Ser. No. 529,012 and assigned to the same assignee named herein and now U.S. Pat. No. 4,084,228 of Apr. 11, 1978.

BACKGROUND OF THE INVENTION

1. Field of the Invention

This invention relates generally to data processing systems and more particularly to information protection hardware and techniques.

2. Description of the Prior Art

Computer systems have grown from the simple batched systems, wherein the valuable resource of random access memory was allocated to a single program, to the present day multiprogramming, multiprocessing systems wherein information is shared among a community of users. In this type of shared environment protection of shared information is required not only to maintain user security and privacy and restrict access of information to those users entitled to it, but to guarantee system integrity and reliability by limiting the propagation of errors through intentional or unintentional altering of shared information. Hence the relatively simple problem of protecting the supervisor from the user in a batch system has been magnified several times because of the requirement that information be flexibly shared not only between system and user but between user and user.

Several schemes have been utilized in the past in order to protect information. Some of them are detailed by Robert M. Graham in a paper entitled "Protection in an Information Processing Utility", published in CACM (May 1968).

One such method restricts access of inactive information on various storage mediums by providing a mode switch for executing instructions in one of two modes---master or slave. Under this scheme there are privileged instructions and non-privileged instructions. When the mode switch is set in master-mode all instructions may be executed whereas if the mode switch is set in slave mode only the non-privileged instructions may be executed. To protect active information in working store, the memory is further partitioned so that all of the memory is available when executing in master mode, but only a portion of the memory is available when executing in slave mode. A memory bounds register in conjunction with the mode switch is utilized to set the bounds of accessability.

This type of memory protection is inadequate for present day multiprogramming systems because there is no provision for gradations of privilege or gradations accessability, and severely limits the control over access to information. There should be provisions for different access rights to the different types of information. A partial answer to this problem is found in the concept of a memory having a segment as the unit of information to which access is controlled. Varying degrees of access to each segment is possible by providing for different types of privileges attached to each segment such as master/slave, write/no-write and execute/no-execute. However, this method of protecting the privacy and integrity of information does not take into account the user of the information. Under this type of protection, privilege is not accorded the user but the information being protected. Hence a user if he has access at all to a segment has access similar to all other users who have access to the segment. David C. Evans and Jean Yves LeClerc in a paper entitled "Address Mapping and the Control of Access in an Interactive Computer," SJCC 1967, recognized the problem and attempted a solution. Evans and LeClerc said in that article p. 23, "The user of a computing system should be able to interact arbitrarily with the system, his own computing processes, and other users in a controlled manner. He should have access to a large information storage and retrieval system called the file system. The file system should allow access by all users to information in a way which permits selectively controlled privacy and security of information. A user should be able to partition his computation into semi-independent tasks having controlled communication and interaction among tasks. Such capability should reduce the human effort required to construct, debug, and modify programs and should make possible increased reliability of programs. The system should not arbitrarily limit the use of input/output equipment or limit input/output programming by the user." Evans and LeClerc proposed conditioning access rights on the procedure-in-execution. The segment, under their proposal, is still the unit of information to which access is controlled; however, a segment's access control attributes are recorded substantially in a user-name versus procedure tables whose entries are the access modes. Such a solution, however, has serious drawbacks. For one, the construction and updating of each segment's table of access control attributes presents a formidable task. For another, too many uses of the segment and event occurrences must be foreseen. To overcome this problem access control by procedure-set was suggested. Under this suggestion, related procedures are grouped into "sets of procedures" and access rights to segments is based on the identity of the set to which the procedure seeking access belongs. This method alleviated the problem of constructing and updating each segment's voluminuous tables of access control attributes, but introduced the problem of determining to which set a given procedure belonged, particularly when a procedure was or could be a number of many sets. This ambiguity in defining sets, and the possible transitions between sets makes the implementation of access control based on "sets of procedures" extremely difficult.

To overcome the difficulties encountered with the "set" technique a ring concept was developed. The ring concept groups the sets of procedures into rings that can unambiguously be ordered by increasing power or level of privilege. By assigning a collection of sets to a collection of concentric rings, and assigning numbers to each ring with the smallest ring having the smallest number and each succeeding larger ring having a progressively greater number, different levels of privilege can then be unambiguously assigned to the user of a segment. Under this concept the innermost ring having the smallest number assigned to it has the greatest privilege. Hence it can be postulated that users in the lowest ring number can access information having higher ring numbers, but users in a higher ring number cannot access information having lower ring numbers or can access information in a lower ring number only in a specified manner. This palpable change of power or level of privilege with a change in rings is a concept which overcomes the objections associated to a change of sets.

Multics (Multiplexed Information and Computing Service) is an operating system developed primarily by Massachusetts Institute of Technology, in cooperation with General Electric Co. and others which first utilized the ring theory of protection in software on a converted Honeywell 635 computer and later on a Honeywell 645 computer. The Multics philosophy utilizes 64 rings of protection numbered as rings 0–63 and is set forth generally in a paper entitled "Access Control to the Multics Virtual Memory" published by Honeywell Information Systems Inc. in the Multics Technical Papers, Order No. AG95, Rev. 0. A more detailed description of Multics ring protection is to be found on chapter 4 of a book entitled "The Multics System; An Examination of its Structure," by Elliott I. Organick, published by MIT Press, and also in the Multics System Programmers Manual 1969, MIT Project MAC. Briefly, the Multics system does not utilize a "pure ring protection strategy" but rather employs the "ring bracket protection strategy" wherein a user's access rights with respect to a given segment are encoded in an access-mode and a triple of ring number (r1, r2, r3) called the user's "ring brackets" for a given segment. A quotation from pages 137–139 from the Multics Technical Paper entitled, "Access Control to the Multics Virtual Memory" sets out the rules and conditions for using and changing rings. "The Rules. The ring brackets, (r1, r2, r3), which must satisfy the relations r1 < r2 < r3, are interpreted as follows. (Note that all ring intervals are inclusive).

a. If the user's access-mode contains WRITE the user may, in rings (0, r1), write in the segment.
b. If the user's access-mode contains READ the user may, in rings (0, r2), read the segment.
c. If the user's access-mode contains EXECUTE the user may:
  1. in rings (r1, r2) call the segment without changing rings;
  2. in rings (0, r1-1), call the segment, switching to ring r1;
  3. in rings (r2+1, r3), call the segment switching to ring r2.
    Every attempt by the process to switch to a lower numbered ring in this way must pass a legitimacy test imposed by the access control mechanism and by the procedure being entered.
d. All ring switching must be done under the supervision of the access control mechanism.
e. The concept of 'return from a call' must be extended to imply a return to the caller's ring. "Under these rules we see that a utility routine may be given ring-brackets (0,63,63) and so be callable in all rings, but never occasion a change of rings upon being called. On the other hand, a critical system procedure might have ring brackets (0,0,0) and so be callable and executable only in ring 0.

"We also see that a user who has read and write permission for a data segment may be given ring brackets (a,b,b) with a b so that the domain in which he has write permission, ring (0,a) is a relatively privileged subset of the domain in which he has read permission, ring (0,b). These comments show how the ring bracket strategy corrects the defects which we noticed in the preliminary strategy.

"Ring Changing Calls. Let us now discuss inward and outward calls. The 'rules' provide that every procedure segment for which 0 r1 may be entered via an outward call (from ring 0, for instance) and that those procedure segments for which r2 < r3 are 'gate' segments and may, therefore, be entered via inward calls (from ring r3, for instance).

"An inward call is made when a procedure in an outer ring wants to increase the power of its process temporarily in order to do a job requiring such increased power. For example, a user procedure may call a system procedure in ring 0. The notion of "inward call" brings to mind "the tail wagging the dog", since lesser power directs the user of greater power. The only segments which can be entered via inward calls are, therefore the 'gate' segments. The duty of a gate segment, is to perform a test of the legitimacy of the inward call, that is, to see that the caller has not, by accident or design, asked the gate segment to behave irresponsibly. Whether or not a segment is a 'gate' for a particular user depends on that user's ring brackets and access-mode respecting that segment.

"An outward call is made when a procedure executing in an inner ring wants a job done which can (and perhaps must) be accomplished with the comparatively feebler power of an outer ring. For example, a process in Multics initializes itself (a system function) in ring 0 but calls out to a user ring when ready to do the user's work. In this case, the process must call out since a Multics convention forbids user work to be done in ring 0. For another example, a programmer with a collection of more or less debugged procedures may use several rings, keeping the more debugged procedures and their data in the inner rings so that damage from the other procedures will be isolated in the outer rings. If these procedures call each other freely, outward calls will presumably occur."

"The above described "ring protection concept" was first implemented with software techniques utilizing 64 separate rings. Subsequently an attempt was made to define a suitable hardware base for ring protection. The Honeywell 645 computer represents a first such attempt. The Honeywell 645 system differs from the "ringed hardware" concepts described supra in several respects which when taken together, and up to the fact that the Honeywell 645 is a 2-ring rather than a 64-ring machine, and has in lieu of a "ring register", a master mode and a slave mode, which imparts greater power to the processor when in master mode than when in a slave mode. "The access control field of the 645's SDW (segment descriptor word) contains no information about rings; in particular it does not contain ring brackets. It does, however, contain either:

(a) access-mode information possibly including either of the two descriptors;
    accessible in master mode only,
    master mode procedure;

(b) the specification of one of eight special 'directed' faults (traps) which is to occur whenever the segment descriptor words (SDW) is accessed.

"The procedure is only 'in master mode' when executing a procedure whose SDW indicates a 'master mode procedure.' The processor may enter master mode while executing a slave mode procedure by:
    faulting,
    taking an interrupt."

"The 645 processor's access control machinery interprets the SDW during the addressing cycle and causes the appropriate action to occur depending on the SDW and (usually) on the attempted access, as follows:

a. If the SDW implies a particular "directed fault", then that fault occurs.
    b. Otherwise, if the SDW does not permit the attempted access, the appropriate access violation fault occurs.

Otherwise, the SDW permits the attempted access and the access is performed.

"When a fault occurs, the 645 enters master mode and transfers control to the appropriate master mode fault handling procedure." (Access Control to the Multics Virtual Memory, supra pps. 157-158).

Another paper by Michael D. Schroeder and Jerome H. Saltzer entitled "A Hardware Architecture for Implementing Protection Rings" published in Communications of the ACM, March 1972 Vol. 15, No. 3, sets forth background and theory of ring protection and describes a hardware implementation of "ring protection."

Because the Multics and Honeywell 645 version of ring protection was implemented mainly in software, considerable operating system supervisor overhead was entailed particularly when calls to greater or lesser power were made by trapping to a supervisor procedure. What was required was an access control mechanism which had the functional capability to perform effectively its information protection function, was relatively simple in operation, was economic to build, operate and maintain, and did not restrict programming generality. The Honeywell 6000 computer system met these requirements by implementing most of the ring protection mechanism in hardware. Hence special access checking logic, integrated with the segmented addressing hardware was provided to validate each virtual memory reference, and also some special instructions for changing the ring of execution. However certain portions of the ring system particularly outward calls and returns or calls to a lesser power and returns therefrom presented problems which required the ring protection function to be performed by transferring control to a supervisor. What is now needed are further improvements in hardware and techniques that will permit a full implementation of ring protection in hardware/firmware and will meet the criteria of functional capability, economy, simplicity and programming generality.

OBJECTS

It is an object, therefore, of the instant invention to provide an improved computer ring protection mechanism.

It is another object of the invention to provide improved computer ring protection techniques and hardware.

It is still a further object of the invention to provide an improved hardware/firmware implemented computer ring protection mechanism.

Another object of the invention is to provide a computer ring protection mechanism which permits inward calls (calls to a lower ring number) via a "gate", but does not permit outward calls.

Yet another object of the invention is to provide an improved ring protection mechanism wherein a procedure in "read/write mode" may execute in predetermined rings whereas a procedure in "execute mode" may execute in predetermined ring brackets.

Still another object of the invention is to provide a ring crossing mechanism utilizing hardware recognizable push down stacks and a procedure call mechanism.

These and other objects of the invention will become apparent from the description of a preferred embodiment of the invention when read in conjunction with the drawings contained herewith.

SUMMARY OF THE INVENTION

The foregoing objects of the instant invention are achieved by providing computer ring protection techniques and hardware having four ring classes numbered 0 through 3. Each ring represents a level of system privilege with level 0 (the innermost ring) having the most privilege and level 3 (the outermost ring) the least.

Computer data and procedures are protected by preventing processes from interfering with each other or sharing each other's address space in an unauthorized manner by utilizing a ring protection scheme which operates in hardware/firmware and restricts addressability to memory according to levels of privilege.

Processes use a segmented address during execution wherein predetermined fields in segment and/or procedure descriptors assign the address space of the various processes in the system, according to levels of privilege. Hardware checks determine that the address used by a process is part of the address space assigned to the process, and if the address is outside the level of privilege assigned, then access to addressed information is denied.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by references to the following description taken in conjunction with the drawings in which:

FIGS. 4A-4J are schematic diagrams of various novel hardware structures utilized in the invention

FIGS. 7a-7h and FIGS. 8a-8d are detailed logic block diagrams of the ring protection hardware.

FIGS. 9a-9k is the legend of symbols utilized in the diagrams of the invention.

DETAILED DESCRIPTION OF THE INVENTION

General

Figure 1:
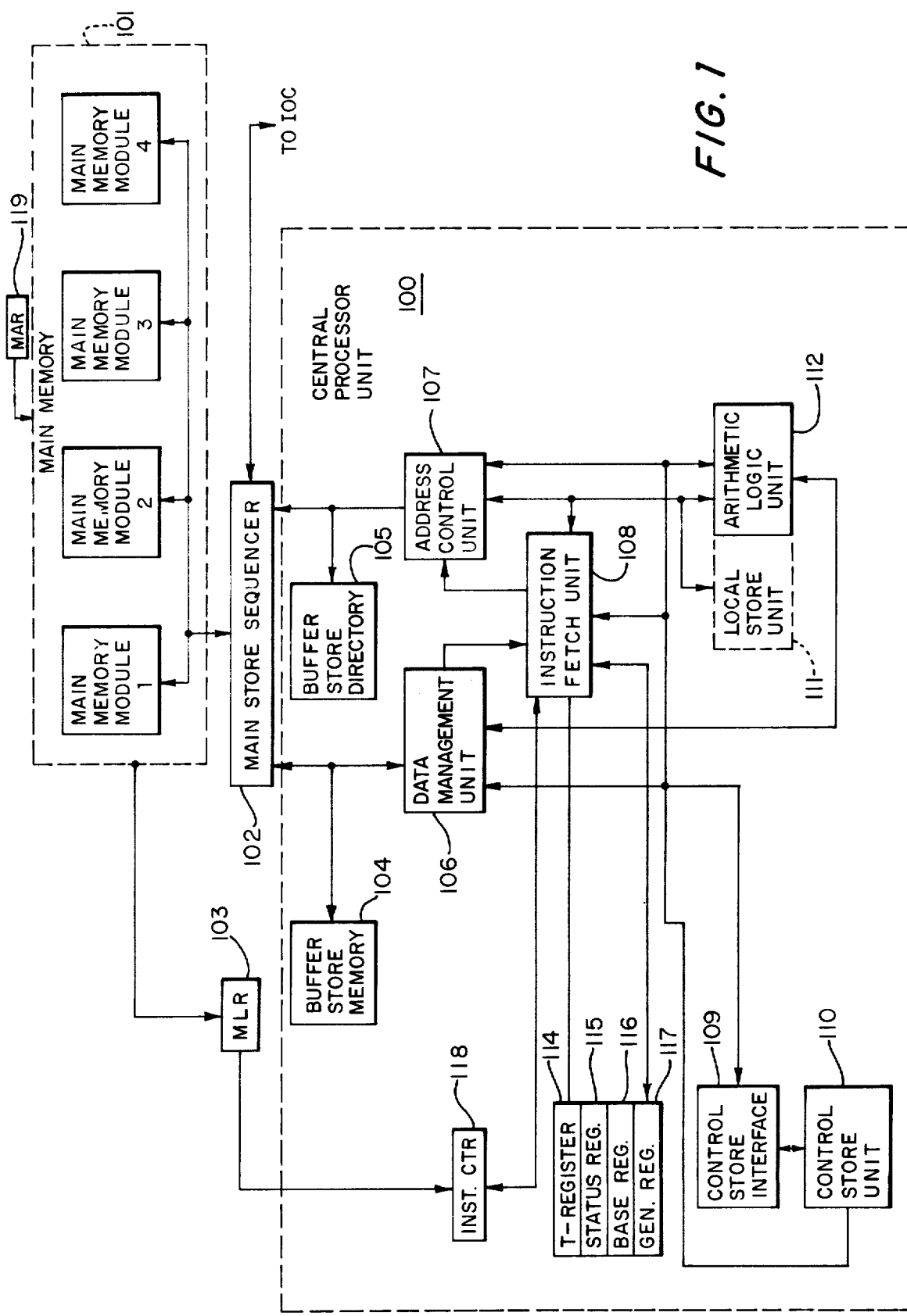
FIG. 1 is a block diagram of a computer system utilizing the invention.

A multiprogramming multi-processor environment as disclosed herein has many programs in memory at any given time. Consequently a system of dynamically allocating memory space is assumed by the operating system and the hardware. It has also been shown that because of the random size of programs, the operating system allocates memory into variable size segments and has facilities to restructure the memory allocation within the course of a program run. Moreover, software creates and deletes processes within the system. (A process is herein defined as the controlled execution of instructions without concurrency.) A process with a new virtual memory is created for each user when he logs into the system, and the process is associated with the name of the user. Hence a process may be thought of as the agent of the user by which the user references and manipulates information stored in the system. A process can be in one of four possible states at any time: running, ready, waiting or suspended. Hardware recognizes these four possible process states and executes various firmware procedures to effect process dispatching, state changes and to maintain data structures based on a process's state. A process is in the running state when it has control of the central processing unit (CPU). This state involves supplying the CPU with an address space (segment table) and a starting address. The CPU then executes instructions in the procedure segments of the process. The process name (logical address) of the process control block (PCB) for the currently running process is retained in the running process word within the system base. The ready state of a process is equivalent to running except that the process does not have control of the CPU. A process in the ready state is in contention for the CPU with other ready processes and the running process. A process is in the wait state when it cannot continue until a specific event occurs such as a message to the waiting process. A waiting process is not in contention for the CPU but it may be in contention with other waiting processes for the required event. A suspended process is a process which has been stopped for a time by software and may be resumed later. The decision to stop and resume the process is external to the process. Thus, a suspended process is not active and therefore cannot receive notification of event occurrences and cannot utilize the CPU.

Processes move from one state to another voluntarily by action of the process while running or involuntarily by the actions of other processes. They utilize procedures which are software functions or algorithms which are executable by a computational processor without concurrency. Sharing of information between procedures takes place at two levels. One is the level of information residing on secondary storage and considered to be files or data in a data base. Allowing this form of sharing efficiently while maintaining privacy and integrity of the data involved and while preventing the occurrence of system disasters like system crash, loss of the data base, or the system deadlock are the responsibility of data management.

The other sharing level is at the execution level and occurs in virtual memory. At this level sharing is always at the level of the segment either data or procedure. It takes three basic forms:

(1) Direct sharing of segments among the processes making up one process group;
(2) Direct sharing of (system) segments among all or a subset of the processes in the machine;
(3) Sharing of segments through indirection.

The first form of sharing is at the discretion and of the control of the process group (see GLOSSARY for definition), although it is conceivable that system procedures or data may be made available to and be shared by the process group at this level. Protection of information occurs through the ring mechanism to be hereinafter described in detail; in general two rings are available as user rings, two as system rings, and read, write, and execute access are separately protected. Basically the segment is shared by allowing it to be in the address space of two or more processes in the process group. It is important to understand that a segment shared at this level cannot be directly accessed by any process (user or system) not in the process group.

The second form of sharing is associated with the principle that operating system software should run as part of the user process whenever possible, since this leads to a considerable enhancement of performance because the overhead both of process swapping itself and of the housekeeping required for central execution of system programs is avoided. In this form of sharing, all segments designated as system-wide are available to the process and also to every other process in the machine, i.e. they are in the address space of every process. The unit of sharing is again the segment and protection is provided by the ring mechanism. Note that this form of sharing is a nonselective one; all such "system" segments are addressable by all processes.

The third form of sharing is provided to allow selective sharing. This is especially useful for such parts of the operating system as data management where, for example, a buffer is selectively shared among users. This is made possible through the use of indirect segment descriptors, where a process refers to the segment not directly through its address space but indirectly through the segment descriptor in another address space.

These forms of sharing are implemented in part by the use of segment tables. Typically 14 tables (although any other convenient number may be utilized) available to a process are divided into three classes. One set of table numbers are reserved for system segments and one copy of these are used by all processes; these are called the system-global segment tables. Another set of table numbers are reserved for those segment tables shared within a process group and are called the process-group-local segment tables; (there is one group of these per process group if they are needed by the process group); the remainder of the tables are private to a process; these are the process-local segment tables. The first form of sharing described above is now accomplished by including the segments to be shared in process group local segment tables. The second form is accomplished by including the segments to be shared in system global tables. The third form is accomplished by use of the indirect segment descriptor which can provide access to any segment. Note that except for this form of indirection, the segment in the process local table can be accessed only by the process to which the table is attached.

Segmentation

As shown in the hereinbefore referenced patent application entitled Segmented Address Development, the segment tables isolate the address space of the various processes in the system. Processes always use a segmented address during execution. A segmented address consists of a segment number and a relative address within the segment number. The hardware checks that the address used by a process is part of the address space assigned to the process. If the address is outside the prescribed address space, an exception occurs. A process cannot refer to data within the address space of another process because the hardware uses the segment tables of the referencing process. Thus, there is no possibility for a process or a process group to reference an entity belonging to another process group. Generally, overlap in address space in the system occurs for those segments shared by all processes. These public segments are created by system programs which check to insure against address conflicts. Thus, segmentation protects user programs against each other and protects the operating system against user programs. However segments shared by several processes are not protected from misuse by one of these processes. To solve this problem a ring protection method and hardware is utilized.

Protection and Rings

Figure 2:
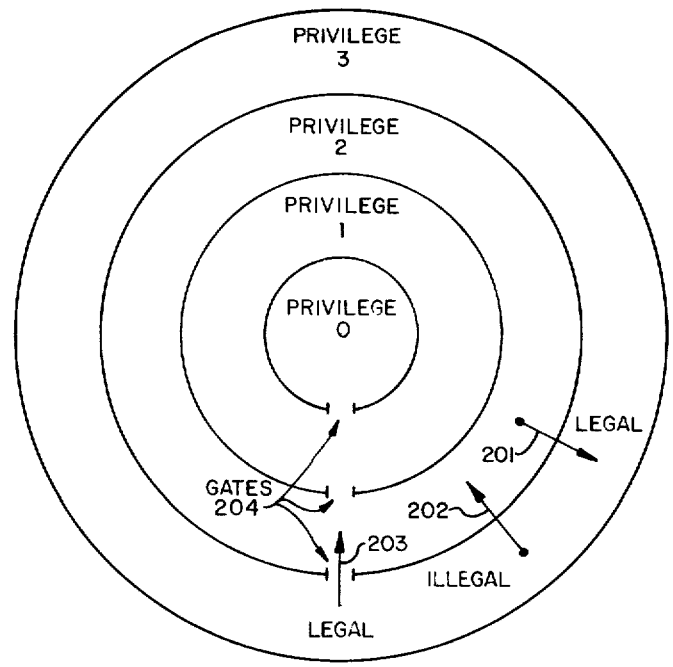
FIG. 2 is a schematic diagram illustrating the levels of privilege of the invention.

As previously discussed the ring concept of information protection was originated on MULTICS and implemented on various Honeywell Computer Systems. The original MULTICS concept required 64 rings or level of privilege and later implementation had the equivalent of two rings on the Honeywell 645 and 8 rings on the Honeywell 6000. The instant invention groups data and procedure segments in the system into a hierarchy of 4 rings or classes. (Refer to FIG. 2). The 4 rings or privilege levels are identified by integers 0-3; each ring represents a level of privilege in the system with level 0 having the most privilege and level 3 the least. Level 0 is known as the inner ring and level 3 as the outer ring. The basic notion as previously discussed is that a procedure belonging to an inner ring has free access to data in an outer ring. Conversely a procedure in an outer ring cannot access data in an inner ring without incurring a protection violation exception. Transfer of control among procedures is monitored by a protection mechanism such that a procedure execution in an outer ring cannot directly branch to a procedure in an inner ring. This type of control transfer is possible only by execution of a special "procedure-call" instruction. This instruction is protected against misuse in a number of ways. First, a gating mechanism is available to insure that procedures are entered only at planned entry points called gates when crossing rings. The segment descriptor of such a procedure contains a gate bit indicating that procedures in this segment can be entered only via gates; information regarding these gates is contained at the beginning of the segment and is used by the hardware to cause entry at a legal entry-point. The procedure itself must then verify (in a way which, of necessity depends on the function of the procedure) that it is being legitimately called. A further hardware protection mechanism is available in the case that the calling procedure supplies an address as a parameter; it is then possible that the more privileged procedure would invalidly modify information at this address which the less privileged caller could not have done, since the ring mechanism would have denied him access; an address validation instruction is available to avoid this possibility.

An important convention is required here in order to protect the procedure call mechanism. This states that it is not in general permissible to use this mechanism to call a procedure in a less privileged ring and return to the more privileged one. This restriction is necessary since there is no assurance that the procedure in the higher ring will, in fact, return; that it will not, accidentally or maliciously, destroy information that the more privileged procedure is relying upon; or that it will not, accidentally or maliciously, violate the security of the stack (see GLOSSARY for definition). Any of these could lead to unpredictable results and crash the system.

The levels of privilege are quite independent of the process control mechanism and there is no notion here of privileged and non-privileged processes as in the IBM system 360. Instead the same process can execute procedures at different levels of privilege (rings) subject to the restrictions imposed by the ring mechanism. In this sense the ring mechanism can be viewed as a method for subdividing the total address space assigned to a process according to level of privilege.

The ring mechanism defined herein permits the same segment to belong up to 3 different rings at the same time i.e. there are 3 ring numbers in each segment descriptor, one for each type of possible access. Thus the same segment can be in ring one with respect to "write" access, ring two with respect to "execute" access and ring three with respect to "read" access. One obvious use for this is in the case of a procedure segment which can be written only by ring zero (perhaps the loader) but can be executed in ring three.

Of the four available rings, two are allocated to the operating system and two to users. Ring zero, the most privileged ring, is restricted to those operating system segments which are critical to the operation of the whole system. These segments form the hard core whose correctness at all times is vital to avoid disaster. Included would be the system information base, those procedures dealing with the organization of physical memory or the initiation of physical data transfer operations, and the mechanisms which make the system function, like the "exeception supervisor, the scheduler, and the resource management."

Ring one contains a much greater volume of operating system segments whose failure would not lead to catastrophe but would allow recovery. Included herein are the language translators, data and message management, and job and process management. Through the availability of two rings for the operating system, the problem of maintaining system integrity is made more tractable, since the smaller hard core which is critical is isolated and can be most carefully protected.

Rings three and four are available to the user to assign according to his requirement. Two important possibilities are debugging and proprietary packages. Programs being debugged may be assigned to ring four while checked out programs and data with which they work may be in ring 3; in this way the effect of errors may be localized. Proprietary programs may be protected from their users by being placed in ring 3 while the latter occupy ring four. In these and other ways, these two rings may be flexibly used in applications.

The General Rules of the Ring System

1. A procedure in an inner ring such as ring 2 on FIG. 2 has free access to data in an outer ring such as ring 3 and a legal access (arrow 201) results. Conversely a procedure in an outer ring such as ring 3 cannot access data in an inner ring such as ring 2 and an attempt to do so results in an illegal access (arrow 202).

2. A procedure in an outer ring such as ring 3 can branch to an inner ring such as ring 1 via gate 204 which results in a legal branch 203, but a procedure operating in an inner ring such as ring 2 may not branch to an outer ring such as ring 3.

3. Each segment containing data is assigned 2 ring values, one for read (RD) and one for write (WR). These ring values specify the maximum ring value in which a procedure may execute when accessing the data in either the read or write mode.

Each time a procedure instruction is executed, the procedure's ring number (effective address ring, EAR) is checked against the ring numbers assigned to the segment containing the referenced data. The EAR is the maximum number of process ring numbers in the processor instruction counter (see later description) and all ring numbers in base registers and data descriptors found in the addressing path. Access to the data is granted or denied based on a comparison of the ring numbers. For example, if a system table exists in a segment having a maximum read/ring value of 3 and a maximum write/ring value of 1, then a user procedure executing in ring 3 may read the table but may not update the table by writing therein.

Procedure Calls and the Stack Mechanism

The procedure call and stack mechanism which is the subject of another invention assigned to the same assignee as the instant application entitled Procedure Calls and the Stack Mechanism by Marc Appell et al, now abandoned, Ser. No. 529,019 and filed on the same date as the instant application and incorporated herein by reference, is an important mechanism utilized by the ring protection mechanism of the instant invention. Procedure calls are used to pass from one procedure to another; to allow user procedures to employ operating system services; and to achieve a modular structure within the operating system. A procedure call is effected by instructions and a hardware recognized entity called a stack.

A stack is a mechanism that accepts, stores and allows retrieval of data on a last-in-first-out basis. Stacks reside in special segments called stack segments. A stack segment consists of a number of contiguous parts called stack frames which are dynamically allocated to each procedure. The first stack frame is loaded into the low end of the segment and succeeding frames are loaded after it. The last frame loaded is considered the top of the stack. A T-register 114 (see FIG. 1) locates the top of the stack for the currently active process. A virtual T-register exists in the process control block (PCB) of all other processes in the system.

A stack frame consists of three areas: a work area in which to store variables, a save area in which to save the contents of registers, and a communications area in which to pass parameters between procedures. Prior to a procedure call, the user must specify those registers he wishes saved and he must load into the communications area the parameters to be passed to the called procedure. When the call is made, the hardware saves the contents of the instruction counter and specified base registers to facilitate a return from the called procedure.

Each procedure call creates a stack frame within a stack segment and subsequent method calls create additional frames. Each exit from one of these called procedures causes a stack frame to be deleted from the stack. Thus, a history of calls is maintained which facilitates orderly returns.

To insure protection between procedures executing in different rings, different stack segments are used. There is one stack segment corresponding to each protection ring per process. A process control block (PCB) contains three stack base words (SBW) which point to the start of the stack segment for rings 0, 1 and 2 associated with the process. The ring 3 stack segment can never be entered by an inward call; therefore, its stack starting address is not required in the PCB.

The procedure call is used by users who have written their programs in a modular way to pass from one program module to another. It is used by user programs to avail themselves of operating system services. It is used by the operating system itself to achieve a responsive modular structure. The procedure call as is described in the above referenced patent application is effected by hardware instructions and the hardware recognizable stack mechanism.

The main requirements on a procedure call mechanism are:

1. Check the caller's right to call the caller;
2. Save the status of the caller which includes saving registers, instruction counter (for return), and other status bits;
3. Allow for the passing of parameters;
4. Determine valid entry point for the called procedure;
5. Make any necessary adjustments in the addressing mechanism;
6. Enter the new procedure.

When the called procedure terminates or exists, whatever was done in the call must be undone so that the status of the calling procedure is restored to what it was before the call.

As a preliminary to making a procedure call, the instruction PREPARE STACK is executed. This instruction causes those registers specified by the programmer in the instruction to be saved in the stack. It causes the status register (See FIG. 1) to be saved, and provides the programmer with a pointer to parameter space which he may now load with information to be passed to the called procedure.

Another instruction ENTER PROCEDURE permits the procedure call via the following steps corresponding to the requirement specified above:

1. Ring checking—the caller's ring is checked to make sure that this ring may call the new procedure; the call must be to a smaller or equal ring number; and if ring crossing does occur the new procedure must be gated through a gate 204 of FIG. 2. The new ring number will then be that of the called procedure.
2. The instruction counter is saved;
3. Base register 0 (see FIG. 1) is made to point effectively to the parameters being passed;
4. The entry-point of the called procedure is obtained from a procedure descriptor whose address is contained in the ENTER PROCEDURE INSTRUCTION;
5. A pointer to linkage information is loaded in base register number 7;
6. The new procedure is entered by loading the new ring number and the address of the entry-point in the instruction counter.

The remainder of the current stack-frame is also available to the called procedure for storage of local variables.

When the called procedure wishes to return, it executes the instruction EXIT PROCEDURE. The registers and the instruction counter are then restored from their saving areas in the stack.

DESCRIPTION OF A PREFERRED EMBODIMENT

Referring to FIG. 1 there is shown a block diagram and a computer hardware system utilizing the invention. A main memory 101 is comprised of four modules of metal-oxide semiconductor (MOS) memory. The four memory modules 1-4 are interfaced to the central processor unit 100 via the main store sequencer 102. The four main memory modules 1-4 are also interfaced to the peripheral subsystem such as magnetic tape units and disk drive units (not shown) via the main store sequencer 102 and the IOC (not shown). The main store sequencer gives the capability of providing access to and control of all four memory modules. Each memory module typically contains 8 K through 64 K locations with 8 bytes per location. Modules are typically expandable in increments of 8 K bytes; thus, memory modules may typically vary from 64 to 512 kilobytes, and total memory may typically vary from 256 kilobytes, to 2 megabytes. Memory access time is typically 730 nanoseconds per 8 bytes, with read, write, and partial write cycle times of 800, 850, and 945 nanoseconds, respectively. However, because the memory store sequencer 102 can overlap memory cycle request, more than one memory module may be cycling at any given time. The CPU 100 and the buffer store memory 104 and the IOC (not shown) can each access a double word (8 bytes) of data in each memory reference. However, in a CPU memory access, either the four high-order bytes or the four low-order bytes are selected and only four bytes of information are received in the CPU 100.

Operations of the CPU are controlled by a read only memory ROM, herein called the control store unit 110. (Control store units for implementing the invention are found in a book entitled Microprogramming: Principles and Practices by Samir S. Husson and published in 1970 by Prentice Hall Inc. Other typical control store units are described in U.S. patent to Leonard L. Kreidermacher, having U.S. Pat. No. 3,634,883 issued Jan. 11, 1972 and assigned to Honeywell Inc.) Typically the control store unit 110 is an 8000 location, solid state, read only memory ROM with a 150-nanosecond cycle time. Each location in the control store memory can be interpreted as controlling one CPU cycle. As each location of control store is read, its contents are decoded by micro-op decode functions. Each micro-op decode function causes a specific operation within the CPU to take place. For example, control store data bits 1, 2, and 3 (not shown) being decoded as 010 could bring high a micro-op decode function that causes an A register to a B register (not shown) transfer. Because each control store memory location typically contains 99 bits, many micro-op decode functions can be brought high for each control store cycle.

By grouping locations, control store sequencers are obtained that can perform a specific CPU operation or instruction. As each instruction is initiated by the CPU 100, certain bits within the op-code are used to determine the control store starting sequence. Testing of certain flops (not shown) which are set or reset by instruction decode function allows the control store memory to branch to a more specific sequence when necessary.

The control store interface adapter 109 communicates with the control store unit 110, the data management unit 106, the address control unit 107 and the arithmetic logic unit 112 for directing the operation of the control store memory. The control store interface adapter 109 includes logic for control store address modification, testing, error checking, and hardware address generation. Hardware address generation is utilized generally for developing the starting address of error sequencers or for the initialization sequence.

The buffer store memory 104 is utilized to store the most frequently used or most recently used information that is being processed by the CPU. The buffer store memory is a relatively small very high speed memory which typically contains 128 columns and 2 rows, referred to as the upper row and the lower row. It is logically divided into preset blocks which are uniquely addressable. These blocks are called pages and each page of memory contains 32 bytes of information. A particular page may be addressed by the most significant 16 bits of the main memory address, the least significant five bits being used to address a particular byte of information within the page. Pages may be transferred from main memory to buffer store memory with the column assignment maintained—i.e. a page from column one in main memory is always transferred into column one in the buffer store memory. However whether the information is placed on the upper or lower row of the column depends on availability. Therefore, for each column of main memory pages (typically 64 to 512 pages), there are two pages in buffer store. For example, column 37 in main store may contain any two pages of information from column 37 in main memory. The two pages of information contained in the buffer store column at any given time depends on which pages have been most recently accessed by the CPU—i.e. the two most recently accessed pages typically reside in the buffer store memory 104.

Whether a given page of information is contained in buffer store 104 can be determined only by examining the contents of the buffer store directory 105. The buffer store directory is logically divided in the same manner as buffer store, however instead of pages of information, each column in the buffer store directory 105 contains the main memory row address of the corresponding information in the buffer store 104. For example, if column 0 of buffer store 104 contains page 200 in the lower row and page 0 in the upper row, the buffer store directory contains 00001 and 00000 in the lower and upper row respectively. Thus, by accessing the buffer store directory 105 with the column number and comparing the requested row number with the row number contained in the buffer directory location, the CPU can determine whether a given page is contained in buffer store.

The data management unit 106 provides the interface between the CPU 100 and main memory 101 and/or buffer store memory 104. During a memory read operation, information may be retrieved from main memory or buffer store memory. It is the responsibility of the data management unit to recognize which unit contains the information and strobe the information into the CPU registers at the proper time. The data management unit also performs the masking during partial write operations.

The instruction fetch unit 108 which interfaces with the data management unit 106, the address control unit 107, the arithmetic and logic unit 112 and the control store unit 110 is responsible for keeping the CPU 100 supplied with instructions. The unit attempts to have the next instruction available in its registers before the completion of the present instruction. To provide this capability, the instruction fetch unit 108 contains a 12-byte instruction register (not shown) that normally contains more than one instruction. In addition, the instruction fetch unit, under control of the control store 110, requests information (instructions) from main memory 101 before the instruction is actually needed, thus keeping its 12-byte instruction register constantly updated. Instructions are thus prefetched by means of normally unused memory cycles. The instruction fetch unit also decodes each instruction and informs the other units of the instruction's length and format.

The address control unit 107 communicates with the instruction fetch unit 108, the buffer store directory 105, the main store sequencer 102, the arithmetic logic unit 112, the data management unit 106, and the control store unit 110 via the control store interface adapter 109. The address control unit 107 is responsible for all address development in the CPU. All operations of the address control unit, including transfers to, from, and within the unit, are directed by control store micro-ops and logic in the unit. The normal cycling of the address control unit depends on the types of addresses in the instruction rather than on the type of the instruction. Depending on the address types the address control unit may perform different operations for each address in an instruction.

The address control unit 107 also contains an associative memory that typically stores the base address of the 8 most recently used memory segments, along with their segment numbers. Each time a memory request is made, the segment number is checked against the associative memory contents to determine if the base address of the segment has already been developed and stored. If the base address is contained in the associative memory, this address is used in the absolute address development, and a considerable amount of time is saved. If the base address is not contained in the associative memory, it is developed by accessing the main memory tables. However, after the base address of the segment is developed, it is stored in the associative memory, along with the segment number, for future reference.

Interfacing with the address control unit 107, the instruction fetch unit 108 and the control store unit 110 is the arithmetic logic unit 112 which is the primary work area of the CPU 100. Its primary function is to perform the arithmetic operations and data manipulations required of the CPU. The operations of the arithmetic logic unit are completely dependent on control store micro-ops from the control store unit 110.

Associated with the arithmetic logic unit 112 and the control store unit 110 is the local store unit 111 which typically is comprised of a 256-location (32 bits per location) solid state memory and the selection and read/write logic for the memory. The local store memory 111 is used to store CPU control information and maintainability information. In addition, the local store memory 111 contains working locations which are primarily used for temporary storage of operands and partial results during data manipulation.

The central processing unit 100 typically contains 8 base registers (BR) 116 which are used in the process of address computation to define a segment number, an offset, and a ring number. The offset is a pointer within the segment and the ring number is used in the address validity calculation to determine access rights for a particular reference to a segment.

The instruction counter 118 communicates with the main memory local register (MLR) 103 and with the instruction fetch unit 108, and is a 32-bit register which contains the address of the next instruction, and the current ring number of the process (PRN). Also contained in the central processing unit is a T register 114 which also interfaces with the instruction fetch unit 108 and is typically a 32-bit register containing a segment number and a 16-bit or 22-bit positive integer defining the relative address of the top of the procedure stack. The status register 115 is an 8-bit register in the CPU which among other things contains the last ring number—i.e. the previous value of the process ring number (PRN).

The main memory 101 is addressed by the memory address register (MAR) 119, and the information addressed by (MAR) 119 is fetched and temporarily stored in the memory local register (MLR) 103.

Figure 3:
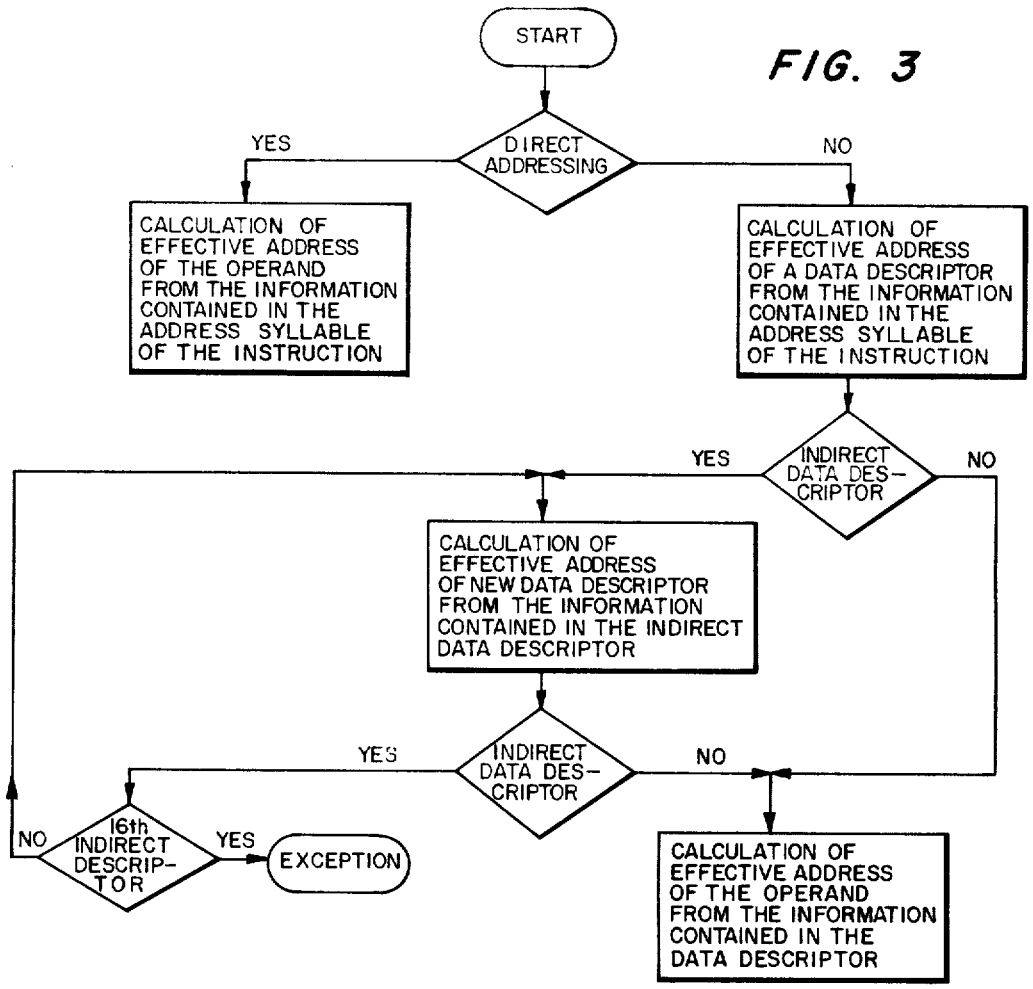
FIG. 3 is a flow diagram of the segmented address scheme utilized by the invention.

Referring now to FIG. 3 there is shown a flow diagram of the general rules for segmented address development shown in detail in the above referenced copending patent application entitled Segmented Address Development. FIG. 3 when read in conjunction with the above referenced patent application is self-explanatory. There is however one major difference between the address development as shown on FIG. 3 to that of the above referenced application and that is that in the address development of FIG. 3 of the instant application as many as 16 levels of indirection may be utilized in the address development whereas in the above referenced application the levels of indirection were limited to a maximum of two. This of course is a matter of choice with the designer and in no way alters the high level inventive concept.

Referring now to FIGS. 4A—4J, FIGS. 4A and 4B show the format of the instruction counter designated by reference numeral 118 on FIG. 1. The instruction counter (IC) 118 is a 32-bit register which contains the address of the next instruction, and the current ring number of the process (PRN). Referring specifically to FIGS. 4A and 4B the TAG is a 2-bit field which corresponds to the TAG field of data descriptors shown and described in the above referenced application entitled Segmented Address Development. PRN is a 2-bit field which defines the current ring number of the process to be used in determination of access rights to main storage. SEG is typically either a 12-bit or a 6-bit field which defines the segment number where instructions are being executed. The OFFSET is typically either a 16-bit or a 22-bit field which defines the address of the instruction within the segment SEG.

FIGS. 4C–4F show the format of segment descriptors with FIGS. 4C and 4D showing the first and second word of a direct segment descriptor whereas FIGS. 4E and 4F show the first and second word of an indirect segment descriptor. Segment descriptors are two words long each word comprised of 32 bits. Referring to FIGS. 4C–4D which show the first and second word respectively of a direct segment descriptor, P is a presence bit. If P equals one, the segment defined by the segment descriptor is present in main storage. If P equals zero, the segment is not present and a reference to the segment descriptor causes a missing segment exception. All other fields in a segment descriptor have meaning only if P equals one. A is the availability bit. If A equals zero, the segment is unavailable (or locked) and a reference to the segment causes an unavailable segment exception. If A equals one, the segment is available (or unlocked, and can be accessed.) I is the indirection bit. If I equals zero, the segment descriptor is direct. If I equals one, the segment descriptor is indirect. U is the used bit. If U equals zero, the segment has not been accessed. If U equals one, the segment has been accessed. U is set equal to one by any segment access. W is the written bit. If W equals zero, no write operation has been performed on the segment. If W equals one, a WRITE operation has been performed on the segment. W is set to one by any WRITE operation. GS is the gating-semaphore bits. When the procedure call mechanism referred to above requires that the segment be a gating segment or when the process communication mechanism (not shown) requires that the segment be a segment descriptor segment (SD) the GS bits are examined. To be a valid gating segment, the GS bits must have the value 10. To be a valid SD segment, the GS bits must have the value 01. If a gating or SD segment is not required, these bits are ignored. The BASE is a 24-bit field which defines the absolute address in quadruple words of the first byte of the segment. This field is multiplied by 16 to compute the byte address of the segment base. The SIZE is a field which is used to compute the segment size. If the STN is greater or equal to zero but less than or equal to six, the SIZE field is 18 bits long. If the STN is greater than or equal to 8 but less than or equal to 15, the SIZE field is 12 bits long. The number of bytes in the segment is equal to 16 times (SIZE+1). If SIZE equals zero, the segment size is 16 bytes. RD is the read access field. This is a 2-bit field which specifies the maximum EAR (effective address ring number) for which a read operation is permitted on the segment. (A procedure is always permitted to read its own segment if EAR equals PRN.) WR is the write access field. This is a 2-bit field which specifies the maximum EAR for which a write operation is permitted on the segment and the minimum PRN at which the segment may be executed. MAXR is the maximum ring number. This is a 2-bit field which specifies the maximum PRN at which the segment may be executed. WP is the write permission bit. This bit indicates whether a WRITE operation may be performed on the segment. If WP equals zero, no WRITE operation may be performed. If WP equals one, a WRITE operation may be performed if EAR is greater than or equal to zero but less than or equal to WR. EP is the execute permission bit. This bit specifies whether the segment may be executed. If EP equals zero, the segment may not be executed. If EP equals one, the segment may be executed at any PRN for which PRN is greater than or equal to WR but less than or equal to MAXR. MBZ is a special field which must be set to zero by software when the field is created, before its initial use by hardware.

Referring to FIGS. 4E–4F the definitions of the various fields are similar as above however word 0 includes a LOCATION field and word 1 includes a RSU field. The LOCATION field is a 28-bit field which defines the absolute address of a direct segment descriptor. The value in the LOCATION field must be a multiple of 8. The RSU field is a special field which is reserved for software use.

FIGS. 4G–4H show the format of the base registers (BR) which are used in the process of address computation to define a segment table number, a segment table entry number, an offset, and a ring number. There are typically 8 base registers as shown by reference numeral 116 on FIG. 1. A base register is specified or identified as base register 0 through 7. The size of a base register is 32 bits long. The base register format of FIG. 4G is utilized for small segment i.e. where STN is greater or equal to 8 but less than or equal to 15, whereas the format of base register of FIG. 4H is utilized for large segments i.e. STN is greater or equal to zero but less than or equal to six. Referring to FIGS. 4G–4H, TAG is a 2-bit field which corresponds to the TAG of a data descriptor referenced previously. RING is a 2-bit field which contains the ring number associated with the segmented address for protection purposes. SEG is a field previously referred to, which identifies a segment described in a segment table. STN is the segment table number, and STE is the segment table entry number. OFFSET is a 16-bit field or a 22-bit field depending on seqment table number, which defines a positive integer.

The OFFSET is used in the process of address development as a pointer within a segment.

Referring to FIGS. 4I-4J there is shown the format of the T-register. The T-register is a 32-bit register containing a segment number and a 16-bit or 22-bit positive integer defining the relative address of the top of the procedure stack previously mentioned. The T-register is shown by reference numeral 114 on FIG. 1. The various fields of the T-register have the same definition as described above.

Referring now to FIGS. 3 and 4A-4J a more detailed description of absolute address calculation and access checking is made. In general absolute address calculation consists of fetching a segment descriptor specified by STN and STE and using the segment descriptors in four ways: access checking, computation of the absolute address, bound checking, and updating (U and W flags). As described in copending patent application entitled Segmented Address Development the absolute address may be direct or indirect and is derived by first deriving an effective address from STN, STE, and SRA (segment relative address). STN is extracted from bits 4 through 8 of the base register BR specified in the address syllable of an instruction. If STN is 7, an out of segment table word array exception is generated. STE is extracted from the base register specified in the address syllable. If STN 4:4 (i.e. beginning at bit 4 and including the next 4 bits) is greater than or equal to zero or less than or equal to six, STE is in a base register bits 8 and 9. If STN 4:4 (i.e. 4 bits beginning at bit 4) is greater than or equal to 8 but less than or equal to 15, STE is in a base register BR bits 8 through 15. The segment relative address SRA for direct addressing is computed by adding the displacement in the address syllable; the offset of the base register BR; and the 32-bit contents of an index register, if specified in the address syllable. The sum of these three quantities is a 32-bit unsigned binary integer which must be less than the segment size appropriate to the segment STN, STE.

Indirect addressing is developed by fetching a data descriptor and developing an address from that descriptor. The effective address of the data descriptor is computed as in the direct addressing case with the exception that the index register contents are not used. In developing the address from the data descriptor the effective address may be computed by an indirection to segment ITS descriptor and an indirection to base ITBB descriptor. If the descriptor is ITS the STN and STE are extracted from the descriptor in the same manner as from a base register. SRA is computed by adding the displacement in the descriptor and the contents of an index register as specified in the syllable. If the descriptor is an ITBB descriptor then STN and STE are extracted from the base register specified in the BBR field (i.e. the base register implied by ITBB descriptor) of the descriptor as in direct addressing. SRA is computed by adding the displacement in the descriptor, the offset of the base register, and the contents of an index register is specified in the address syllable.

As shown on FIG. 3 the indirection process may be extended up to 16 levels.

Every effective address contains protection information which is computed in address development and checks for access rights by the ring protection hardware of the absolute address calculation mechanism. The effective address contains protection information in the form of an effective address ring number EAR (see FIGS. 2J and 2K of above referenced application entitled "Segmented Address Development"). The EAR is computed from the base register ring number BRN and from the current process ring number PRN by taking the maximum ring number. In developing the EAR for indirect addressing a somewhat more tedious but essentially similar procedure as indirect addressing is used. In indirect addressing the EAR for extraction of the first descriptor (EAR 1) is once again the maximum of the ring number from the base register specified in the address syllable and the current process ring number PRN in the instruction counter 118 of FIG. 1 and stored in U0 register 512 of FIG. 5. The EAR for extraction of the second descriptor (EAR 2), of multiple level indirection is the maximum of:

a. EAR 1;

b. The ring number in the first descriptor if indirection is indirection to segment;

c. The ring number from a base register 116 utilized as a data base register BBR if the first descriptor is an indirection to segment descriptor ITBB.

The EAR for extraction of the data of multiple level indirection is the maximum of:

a. EAR 2;

b. The ring number in the second descriptor if it is an indirection segment descriptor ITS;

c. The ring number in one of the base registers utilized as a data base register BBR if the second descriptor is an indirection to base descriptor ITBB.

Figure 5:
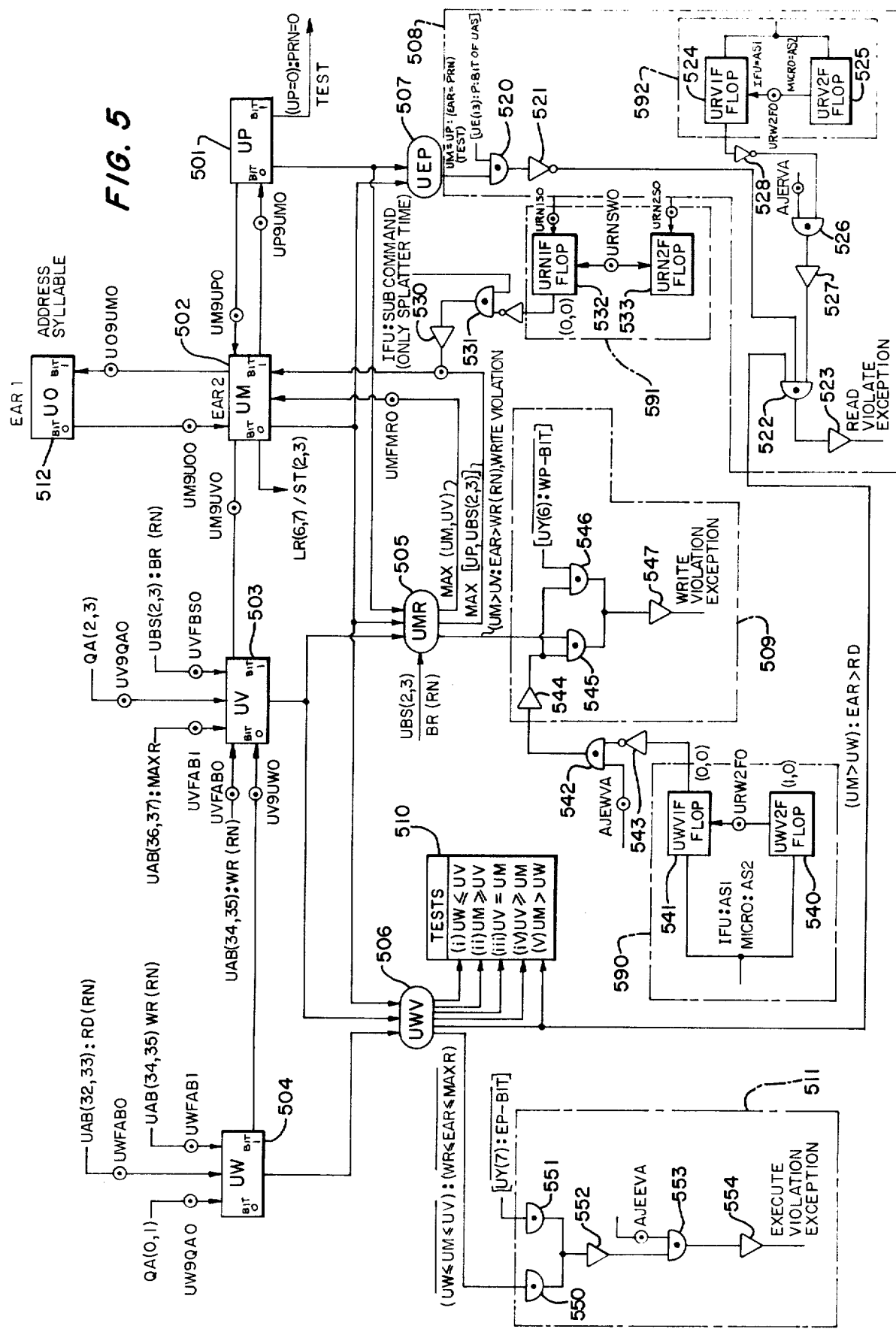
FIG. 5 is a schematic diagram of the computer ring protection hardware.
Figure 6:
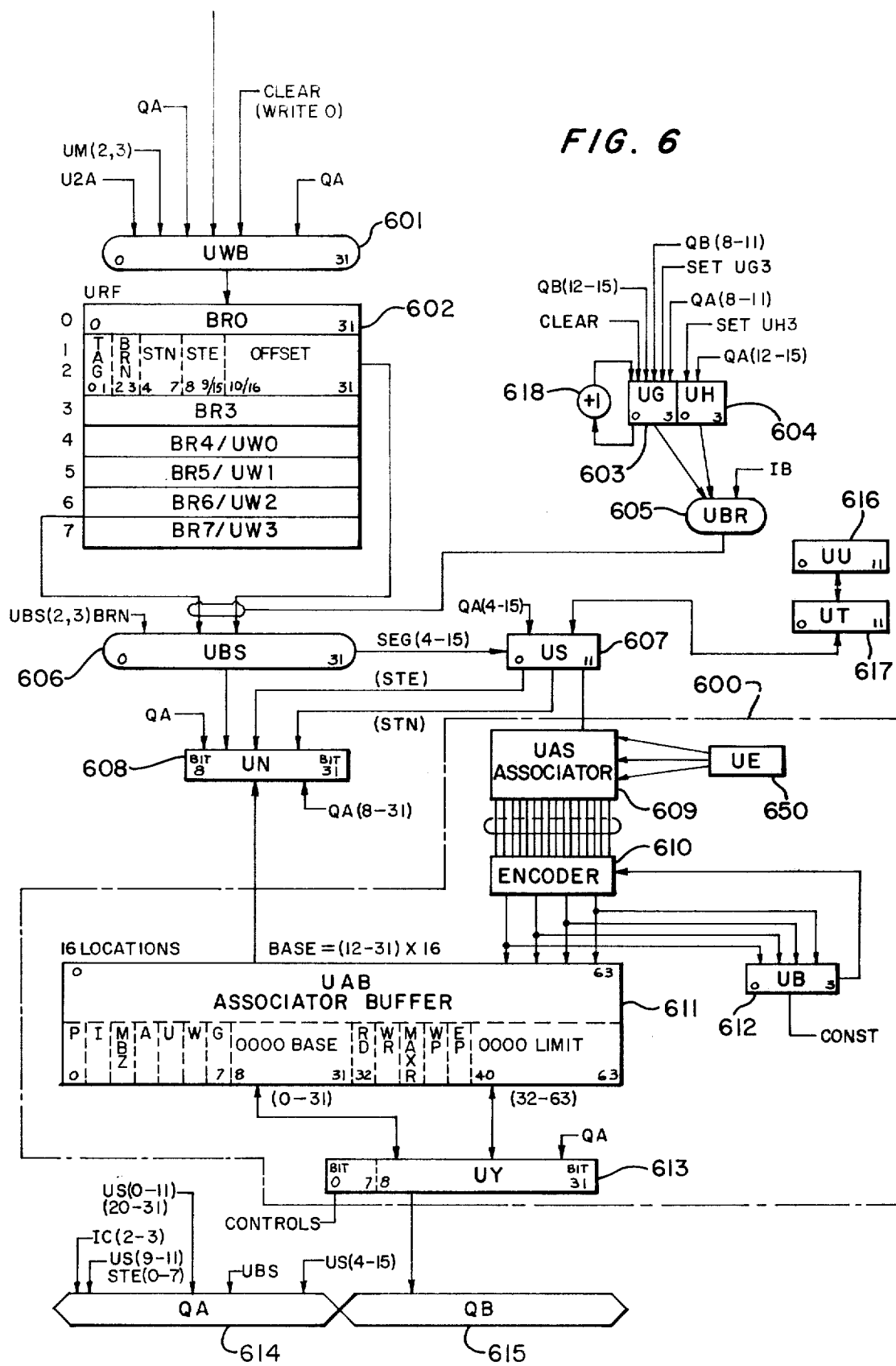
FIG. 6 is a schematic diagram of the computer segmented addressing hardware.

Referring now to FIGS. 5 and 6, the transfer and manipulation of the various type ring numbers will be described at the system level. Detailed logic block diagrams for effecting the transfers and operations of FIG. 5 will be later described. Referring first to FIG. 6 an associative memory 600 is utilized in segmented address development and disclosed in U.S. patent application Ser. No. 283,617 filed 8/24/72 by James L. Brown and Richard P. Wilder, Jr. inventors and entitled, "Address Development Technique Utilizing a Content Addressable Memory." The associative memory 600 comprises essentially a UAS associator 609 which has circuitry which includes associative memory cells, bit sense amplifiers and drivers, and word sense amplifiers and drivers (not shown). A word or any part of a word contained in UAS associator 609 may be read, compared to another word with a match or no match signal generated thereby, or be written either in whole or in a selected part of the associator 609. For example, US register 607 may contain a segment number which may also be in the associative memory 600. A comparison is made with UAS associator 609 and if a match is found a "hit" results. The match or "hit" signal is provided to encoder 610. The function of encoder 610 is to transform the "hit" signal on one of the match lines to a 4 bit address. Encoder 610 provides this 4 bit address to UAB associator buffer 611 so that the information contained in that particular location UAB associator buffer 611 is selected. Information in UAB associator buffer 611 may be transferred to UV register 613 for temporary storage or for transfer to QA or AB bus 614 and 615 respectively. By thus locating a prestored segment number in the associative memory 600 (which may have been placed there after a generation of an absolute address) regeneration of the same address is not necessary. In the drawing of FIG. 6, UAB associator buffer 611 is shown as storing a first and second word of a segment descriptor; however other types of information may just as well be stored therein.

Briefly and with reference to FIG. 6 any of 8 base registers 602 are addressed via UG and UH registers 603 and 604 respectively which contain base register addresses from an instruction address syllable or base register specified by the instruction formats. The base registers 602 contain such information as TAG, base register ring number BRN, segment table number STN, segment table entry STE and OFFSET as shown or contained by base registers 1 and 2 of the group of base registers 602. Writing into the base registers is performed under micro-op control by UWB logic 601. For example it is shown that information from the UM register 502 of FIG. 5 may be written into bit positions (2, 3) of a selected base register; also information from the QA bus may be written into the base registers and provisions are made to clear a selected base register i.e. write all zeroes. Reading out of any of the base registers is performed by UBR logic 605. In general the UBR logic 605 permits the appropriate base register to be strobed out onto bus QA or QB, or into UN register 608. Note that UN register 608 holds bits 8 through 31 of the base registers which is the OFFSET part of the segmented address. Moreover UBR logic 605 when addressed by an address contained in instruction buffer IB (not shown) reads outs the segment number SEG (which is comprised of STN and STE) into US register 607 via UBS transfer logic 606. The comparison of the segment number SEG in US register 607 with the associative memory 600 may then be performed as previously described. It will be noted that bits (4-15) of QA bus 614 may also be read into or from US register 607. Similarly bits (8-31) from QA bus 614 may read into UN register 608. Also bits (9-11) of US register 607 may be read into QA bus 614 as denoted by US (9-11) arrow (the arrows into various register and/or logic circuitry denote the source of data and that followed by a number denote the bit numbers of that data).

Referring now to FIGS. 5 and 6, a 2-bit UP register 501 stores the current process ring number PRN. The current process ring number PRN is obtained from bits 2 and 3 of the instruction counter (118 of FIG. 1) via bits IC (2-3) of the QA bus 614 of FIG. 6. Bits IC (2-3) of QA bus 614 are transferred to 2-bit UV register 503 under control of a micro-operation UV9QA0. The micro-operations are obtained from micro-instructions in the control store unit 110. (On FIG. 5 the dot surrounded by a circle indicates a micro-operation and the first two letters of the name of the micro-operation indicate the destination of the data to be transferred; the fourth and fifth letters indicate the source of the data transferred; the third character indicates whether a full or partial transfer is made with F indicating a full traansfer while the sixth character indicates whether the signal doing the transferring is high or low with even numbers indicating a low signal and odd numbers indicating a high signal. As an example of the use of this convention bits 2 and 3 on QA bus indicating the tail of the arrow QA (2,3) indicate PRN is the PRN process ring number that is being transferred under control of the micro-op UV9QA0 which says the transfer is made to register UV, is a partial transfer of the bus QA, and the source of the data is the bus QA and is an unconditional transfer as indicated by the sixth character being 0. Transfer to UV register from QA bus source is unconditional. This 0 will be the corresponding seventh character in the logic file name of the subcommand UV9QA10.) Once the process ring number PRN is transferred from the QA bus 614 to the UV register 503 another transfer takes place under control of micro-operation UM9UV0 from UV register 503 to UM register 502. Finally another transfer takes place from UM register 502 to UP register 501 under control of a micro-operation UP9UM0.

Two bit register UM 502 is utilized to generate the effective address ring number EAR during ITS and ITBB (i.e. indirection to segment and indirection to base), [EAR=MAX (BRN, PRN, DRN,/ BBR (BRN) etc.)] address formation for address syllable 1 and address syllable 2 type instruction format. The EAR is generated according to the rules previously enunciated by utilizing one or more tests shown in block 510 and the maximum of the ring number is obtained and stored in UM register 502 which stores the effective address ring number EAR (detailed logic or making the comparisons of block 510 are later shown and described in detail). The U0 register is used to save address syllable 1 effective address ring number EAR in the event the address syllable 2 is being utilized to extract EAR 2.

Two-bit UV register 503, and 2-bit UW register 504 is utilized mainly as storage for various ring numbers that are obtained from the outside of ring checking hardware of FIG. 5 and transferred or processed to other parts of the ring checking hardware. For example the base register ring number BRN is transferred from bit positions 2 and 3 of UBS transfer logic 606 to UV register 503 under control of the micro-operation UVFBS0; the maximum ring number MAXR of word 2 of the segment descriptor (also shown stored in bits 36 and 37 of UAB associator buffer 611) is transferred from UAB buffer 611 to UV register 503 under control of the micro-operation UVFAB1; also bits 34 and 35 of UAB buffer 611 which is the write ring number WR is transferred to UV register 503 under control of micro-operation UVFAB0. UW register 504 has similar transfers of other ring numbers from various parts of the system. For example bits 34 and 35 which are the write ring number WR of UAB buffer 611 may also be transferred to UW register 504 under control of micro-operation UWFAB1; bits 32 and 33, the read RD ring number of UAB buffer 611 may also be transferred to UW register 504 under control of micro-op UWFAB0; also bits 0 and 1 of QA bus 614 may be transferred to UW register 504 under control of micro-operation UW9QA0. Note also several transfer paths of UW register 504 into UV register 503 under control of the micro-operation UV-9UW0; the transfer path of UV register 503 into UM register 502 under control of micro-operation UM-9UV0; the transfer path of UM register 502 into UP register 501 under control of the micro-operation UP-9UM0; the transfer path of UP register 501 into UM register 502 under control of micro-operation UM-9UP0; the transfer path of UM register 502 into U0 register 512 under control of micro-operation U09UM0; and finally the transfer path of U0 register 512 into UM register 502 under control of the micro-operation UM-9U00.

Briefly therefore UP register 501 holds the current process ring number PRN; UM register 502 and U0 register 512 are utilized for transfer operations and also to generate the EAR; UV register 503 may store for various purposes and at different times the current process ring number PRN, the base register ring number BRN, the maximum ring number MAXR, the write ring number WR, or the read ring number RD. UW register 504 may at various times hold the read ring number RD, the write ring number WR, and bits 0 and 1 of bus QA.

UMR 505 is logic, the details of which are shown on FIG. 8d, which compares the contents of registers UM and UV and produces the greater of the two values in the registers and this value is stored in UM register 502 under micro-operation control UMFMR0. This is one way of generating the effective address ring number EAR. UMR logic 505 may also produce the greater value of the contents of register UP or of bits 2 and 3 of UBS logic 606. This is another method and/or additional step in generating the effective address ring number EAR. UMR logic 505 is also utilized to determine whether or not a write violation has occurred by transferring a write ring number WR into UV register 503 and then comparing the contents of the UM register 502 (holding EAR) with the contents of UV register 503 in order to determine which one has the greater contents. Since UM register 502 stores the effective address ring number EAR a comparison of the UM register and the UV register will indicate whether EAR is greater than WR or vice versa. If WP (i.e. write permission bit in the segment descriptor) is equal to 1 and if EAR lies in the range of $0 \leq EAR \leq WR$ then a write operation may be performed into the segment. Note that UMR logic 505 may have inputs directly or indirectly from all registers 501–504, from other logic 506, 507, and also from UBS logic 606.

UWV logic 506 corresponds to the detail logic of FIG. 8a. UWV logic 506 has inputs directly or indirectly from registers 501–504 and from logic 505, 507 respectively and generates an execute violation signal when a comparison of UW, UM and UV registers 504, 502, and 503 respectively indicates that the maximum ring number MAXR is greater or equal to the effective address ring number EAR is greater or equal to the write ring number WR is not true i.e. in order for a procedure to be able to execute in a given segment indicated by the effective address the maximum ring number MAXR must be greater or equal to the effective address ring number and the effective address ring number EAR must be equal or greater than the write ring number WR. UWV logic 506 also performs tests shown in block 510. Indicates may be given that the contents of UW register is less than or equal to the contents of the UV register; the contents of the UM register is greater than or equal to the contents of the UV register; the contents of the UV register is equal to the contents of the UM register; the contents of the UV register is greater or equal to the contents of the UM register; and the contents of the UM register is greater than the contents of the UW register. Of course when performing these tests different values of ring numbers may occupy the registers.

UEP logic 507 corresponds to the detail logic of FIG. 8b. UEP logic 507 in combination with UWV logic 506 generates the read violation exception. However the read violation exception may be overridden if the effective address ring number EAR equals the current process ring number PRN, since a procedure is always permitted to read its own segment, and if the segment number of the procedure segment descriptor (not shown herein) and the segment number of the address syllable utilized in generation of the effective address are the same.

To illustrate the overriding of the read violation signal assume that the effective address read number EAR is greater than the read number RD which would generate a read violation high signal which would be applied as one input of AND gate 522. However the read violation exception signal may not be generated even though there is a read violation signal if the following two conditions exsists:

1. The effective address ring number EAR is equal to the process ring number PRN; i.e. the contents of register UM is equal to the contents of register UP; and, 2. The segment number contained in the address syllable of the segment in which a procedure desires to read is equal to the segment number of the procedure segment descriptor (not shown) of the current procedure in execution and this is indicated by setting a bit called a P bit and located as the thirteenth bit of UE register 650. (UE register 650 is a store for the contents of UAS associator 609 when a "hit" has resulted by a comparison of the contents of US register 607). Since this example assumes that EAR equals PRN, UEP logic 507 will apply a high signal to AND gate 520 as one input, and since it is also assumed that the segment number SEG of the address syllable of the segment being addressed is equal to the segment number SEG of the procedure segment descriptor (not shown) of the currently executing procedure, then the P bit of the procedure segment descriptor will be set and hence the other input applied to AND gate 520 will be high thus enabling AND gate 520; a high signal is therefore applied to the input of inverter 521 resulting in a low signal at the output of inverter 521 which low signal is then applied as another input of AND gate 522. Since there is a low signal to AND gate 522 no read violation exception signal can be generated by amplifier 523 even if the third input signal applied to AND gate 522 is high.

To illustrate how a read violation signal is generated and not overriden, assume that the output of UEP logic 507 indicates that the contents of UM register is not equal to the contents of UP register. Then that input to AND gate 520 would be low and hence AND gate 520 would not be enabled and its output would be low and would be applied to the input of inverter 521. Since the input of inverter 521 is low its output would be high which would be applied as one input of AND gate 522. If also the effective address ring number EAR is greater than the read ring number RD (i.e. contents of UM register is greater than contents of UW register) that signal would be high and would be also applied to another input of AND gate 522. AND gate 522 has still a third input which must also be high in order to enable AND gate 522. This third input is high when AND gate 526 is enabled. Since AND gate 526 has one input terminal which is high when the 00 terminal of URV1F flop 524 is low, AND gate 526 is enabled by applying the micro-operation read violation interrogate signal AJERVA to one input terminal of AND gate 526 while the 00 terminal of URV1F flop 524 is low. Thus AND gate 522 will have all input terminals high, generating the read violation exception signal.

The execute violation exception is generated in two ways. It was seen earlier that an execute violation signal results when UWV logic 506 indicates that WR is less than or equal to EAR is less than or equal to MAXR is not true. This high execute violation signal is applied to a one-legged AND gate 550 which in turn is applied to the input terminal of two-legged AND gate 553 via amplifier 552. When aan execute violation interrogate micro-operation signal AJEEVA is applied as another input of two-legged AND gate 553, this exception via amplifier 554. The other method by which the execute violation exception is generated by the execute violation hardware 511 is when the execute permission bit EP is not set. When this condition is true it is indicated by the seventh bit of UY register 613 being high; this bit is then applied to the input terminal of one-legged AND gate 551 which is applied as a high signal to one input terminal of AND gate 553 via amplifier 552. When the execute violation interrogate micro-operation signal AFEEVA goes high, AND gate 553 is enabled and generates an execute violation exception via amplifier 554.

The write violation exception is also generated in two ways. It was seen previously how the UMR logic 505 generates a write violation signal when EAR is greater than WR. This write violation signal is applied to one input terminal of AND gate 545. AND gate 545 is enabled when its second input terminal goes high thus generating a write violation exception through amplifier 547. The second input terminal of AND gate 545 goes high when AND gate 542 is enabled. AND gate 542 is enabled when the input signals applied to its input terminals are high. One input signal is high when UWV1F flop 541 is low which in turn applies a low signal to the input terminal of inverter 543 which in turn applies a high signal to one input terminal of AND gate 542; the other input signal is high when the write violation interrogate micro-op signal AJEWVA is high and this happens when it is desired to interrogate a procedure for the write violation exception. (Flip-fops URV1F, URN1F, and UWV1F are set low when any interrupts or software occurs). (UWV2F, URV2F, and URN2F flip-fops are utilized to store back-up excess checking information for ring checking). The other method for generating a write violation exception is when the write permission bit WP is not set. This condition is indicated by bit 6 of UV register 613 being high. When this condition exists and the high signal (i.e. the sixth bit of UV register) is applied as one input of AND gate 546 and the interrogate signal AJEWVA is high and applied an another input of AND gate 546, then AND gate 546 is enabled and a write violation exception occurs via amplifier 547.

Logic circuitry 591 comprised of flip-flops 532 and 533 in conjunction with amplifier 530 and AND gate 531 and inverter 530A permit the formation in register UM 502 of the maximum value of ring number (i.e. EAR) under control of a splatter instruction subcommand (not described herein) from the instruction fetch unit IFU. Assuming URN1F flip-flop 532 is set to logical 0 whereas URN2F flip-flop 533 is set to logical 1, then during the execution of the splatter subcommand, input terminal 531A of AND gate 531 will be high; therefore if flip-flop 532 is low (logical 0) then the signal will be inverted by inverter 530A and AND gate 531 will be enabled. Hence the maximum value of the contents of UP register 501 or bits 2 and 3 of logic vector UBS 606 will be strobed into UM register 502. Conversely if flip-flop 532 is a logical 1, then the contents of UM register 502 is not changed via the above mentioned sources and the EAR derived in UM register 502 via the addressing process of indirection is the one utilized. Flip-flop 533 is the back-up store for the EAR of address-syllable 2 when utilized.

Figure 7G:
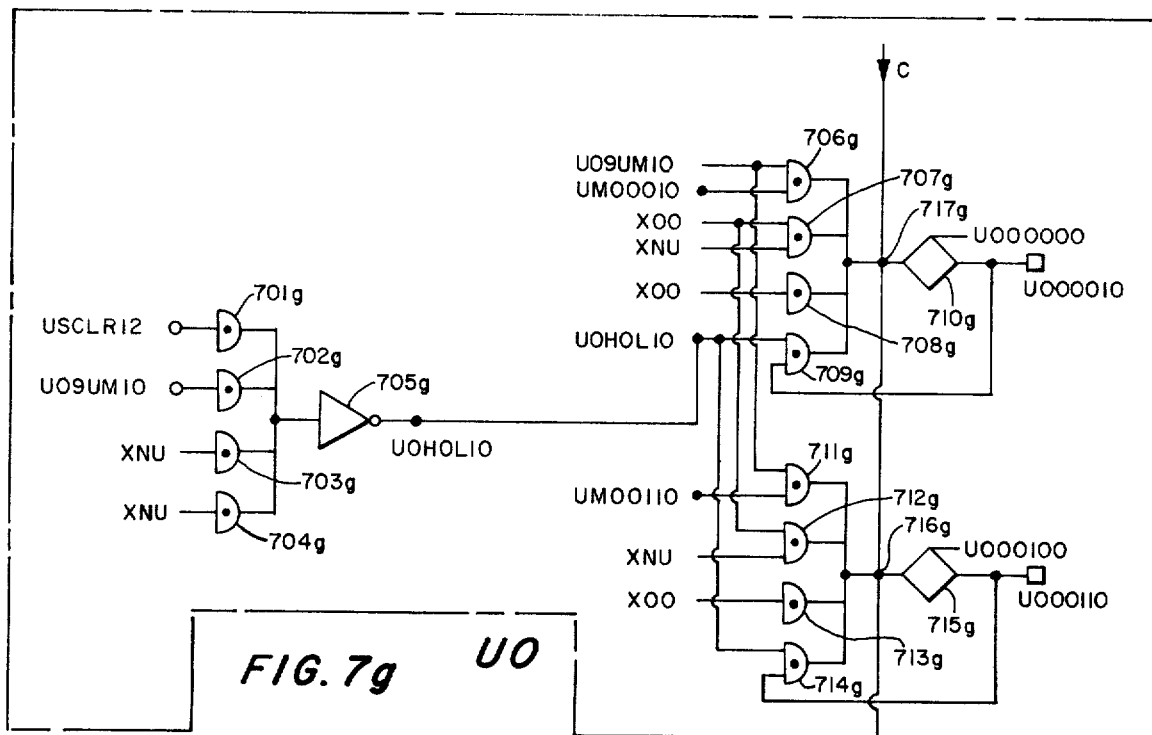
Figure 7F:
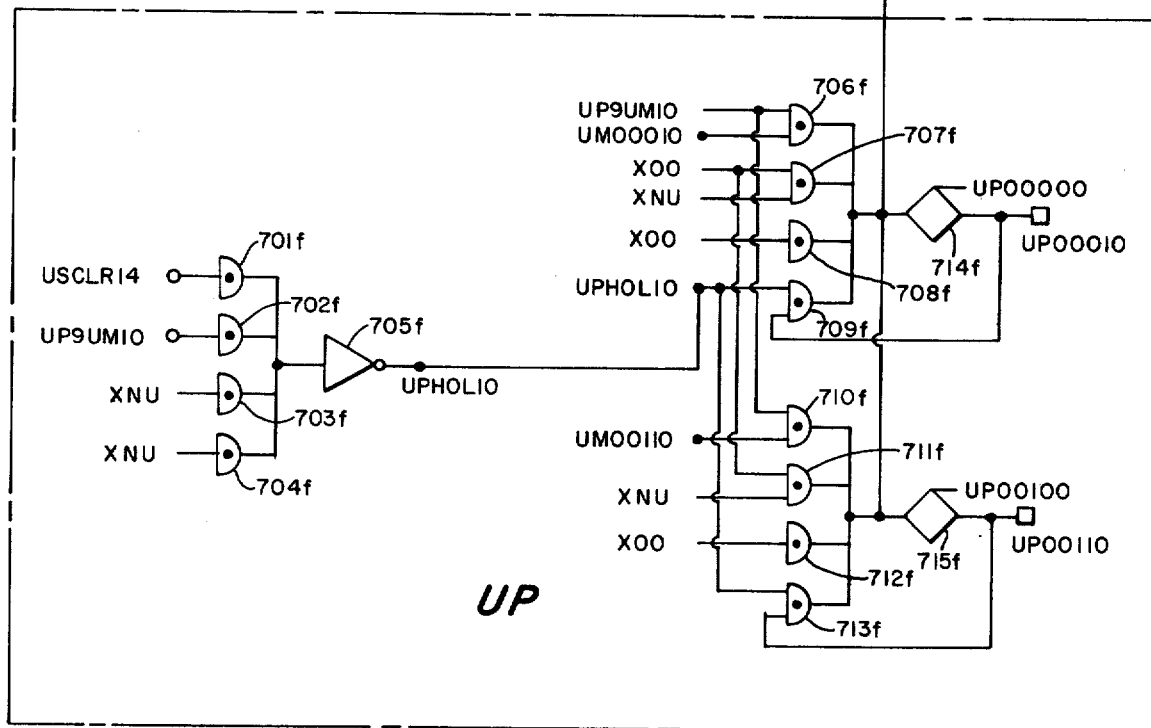
Figure 7H:
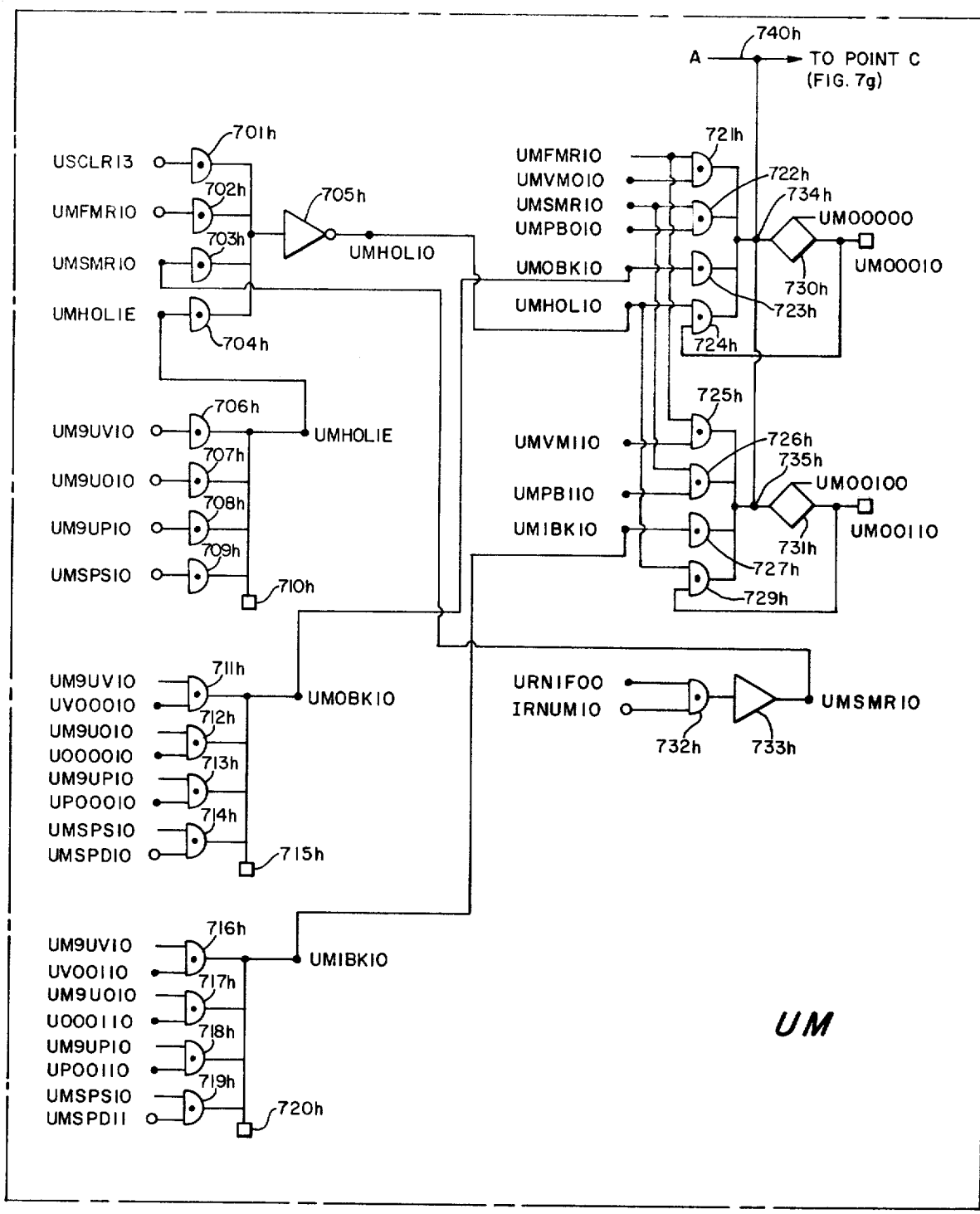

Referring now to FIGS. 7 and 8 and FIG. 5 there is a correspondence wherein the detailed logic for hardware in FIG. 5 is shown in FIGS. 7 and 8 as follows: FIG. 7a and UW register 504; FIG. 7b and UV register 503; FIG. 7c and block 590; FIG. 7d and block 591; FIG. 7e and block 592; FIG. 7f and UP register 501; FIG. 7g and UO register 512; FIG. 7h and UM register 502; FIG. 8a and UWV logic 506; FIG. 8b and UEP logic 507; and FIG. 8d and UMR logic 505.

Referring to FIG. 7a, the UW register 504 is comprised of two flip-flops 715a and 720a respectively, each flip-flop capable of holding one bit of information of the UW register. Coupled to flip-flop 715a and 4 AND gates 711a-714a which are OR'ed together, with each gate (except gate 713a) having two input terminals, and with at least one signal applied to each input terminal. AND gate 714a has one of its input terminals coupled to the set terminal UW00010 of the flip-flop 715a. Flip-flop 715a is also coupled to the terminal H27 for receiving from a clock a timing signal called a PDA signal. Flip-flop 720a coupled to AND gates 716a-719a which are OR'ed together. One input terminal of AND gate 716a is coupled to an input terminal of AND gate 711a; one input terminal of AND gate 717a is coupled to one input terminal of AND gate 712a and one input terminal of AND gate 719a is coupled to an input terminal of AND gate 714a, whereas the other input terminal of AND gate 719a is coupled to the set terminal UW00110 of the flip-flop 720a. Flip-flop 720a is also coupled to the H27 terminal for receiving PDA pulses.

AND gates 701a-704a are OR'ed together each having their output terminal coupled to the input terminal of inverter 705a. AND gate 706a is coupled to amplifier 708a; whereas AND gate 707a is coupled to amplifier 709a; one input terminal of AND gate 706a is coupled to one input terminal of AND gate 707a. The output terminal of inverter 705a is coupled to one input terminal of AND gate 714a and 719a; the output terminal of amplifier 708a is coupled to the input terminal of AND gate 713a and the output terminal of amplifier 709a is coupled to the input terminal of AND gate 718a.

The signals applied to the inputs of AND gates and the signals derived as outputs from amplifiers, inverters, or flip-flops are designated by letters forming a special code. Since both data signals and control signals are either applied or derived there are two codes, one code for the control signals and one code for the data signals. The code for the control signals was previously described in detail and is summarized here. Briefly the first two characters of a control signal indicate the destination of data to be transferred; the third character indicates whether a full or partial transfer is to be effected with the letter F indicating full transfer and any other character indicating a partial transfer; the fourth and fifth character indicates the source of the data, and if the source is identified by more than two letters only the last two letters need be used; the sixth and seventh characters are usually numerals and indicate whether the signal is high or low i.e. an odd numeral in the sixth position indicates assertion and an even numeral in the sixth position indicates negation; the seventh position indicates whether this is the first, second, third, etc. level of occurrence of the signal. Data, on the other hand, is indicated differently. The first three characters of data indicates the source of the data, the fourth and fifth characters which may be numerals indicate the bit positions where the data is located in the source, and the sixth and seventh position are similar to the control signals in that they indicate whether the signal is high or low and the level of occurrence of the signal. Generally the format itself indicates whether the signal is a control signal or a data signal and by reference to FIGS. 5 and 6 the source and destination may be determined. There are exceptions to this general rule and they will be spelled out in the specification, and addendum.

As an example of this convention it will be noted on FIG. 7a that the following signals are control signals: UWFAB11, UWFAB10, UW9QA10. The following signals are data signals UAB3410, UAB3210, UAB3510, UAB3310, QA00110, and QA00010. The following signals are exception PDARG10 is a timing signal whose source is the PDA clock; UWHOL10 is a hold signal for holding the information in the flip-flops 715a and 720a UWOBK10 and UW1BK10 are back-up logic whose main function is to extend the input capability of flip-flops 715a and 720a by connecting the UW register which is in fact formed by flip-flops 715a and 720a, to bit zero and bit 1 represented by flip-flops 715a and 720a respectively; and finally USCLR10 is the clear signal for clearing and setting the flip-flops to zero.

As an illustration of the above mentioned convention herein adopted the signal UWFAB11 applied to the input of onelegged AND gate 702a is a control signal which transfers data (bits 34 and 35) contained in UAB associator buffer 611 (the U in the signal has been omitted) to UW register 504 and is a full transfer to the UW register 1; the odd number indicates the signal is assertion. Signal UWFAB10 applied to the input of onelegged AND gate 703a is a control signal with the same source and destination as the signal applied to AND gate 702a except that bits 32 and 33 of UAB are transferred to UW register. The signal UW9QA10 applied to onelegged AND gate 704a is also a control signal wherein data is transferred from QA bus 614 to the UW register and may be a partial transfer. The signal QA00010 applied to AND gate 706a is a data signal where data is on QA bus 614 (the third position is not herein utilized since the first two positions adequately describe where the data is) and this data signal represents the bit identified as 00 on QA bus 614. The signal QA00110 is similar to the previous signal except the data identified by this signal is the data on position 01 of the QA bus 614. Thus by utilizing this convention and FIGS. 5 through 9 the ring protection hardware is fully defined and may be easily built by a person of ordinary skill in the computer art.

Reffering to FIG. 7b there is shown the detailed logic block diagram for UV register 503. Signal UVHOL10 is a hold signal for UV register 503 which is generated via inverter 730b when none of the onelegged AND gates 701b-708b has a high signal applied to it. UVHOL10 signal is applied to AND gate 723b and causes information stored in the UV register 503 to be held therein. Signal UVHOL1E coupled to the input of AND gate 704b and to the outputs of AND gates 705b-708b extends the number of control signals that may generate the hold signal UVHOL10. Signal UVOBK10 coupled to the outputs of AND gates 710b-713b, and to the input of AND gate 722b is also utilized to extend the number of input signals that may be applied to flip-flop 724b. Signal UV1BK10 coupled to the outputs of AND gates 716b-718b and to the input of AND gate 727b similarly extends the number of input signals that may be applied to flip-flop 729b.

Referring now to FIG. 7g there is shown the detailed logic block diagram of UO register 512. AND gates 701g-704g are OR'ed together and their output is applied as an input to inverter 705g. AND gates 706g-709g are also OR'ed together and their outputs are coupled to flip-flop 710g. Also one input of AND gate 709g is coupled to the U000010 terminal of flip-flop 710g. AND gates 711g-714g are also OR'ed together and are similarly coupled to flip-flop 715g. It will be noted also that an input of AND gate 706g is coupled to an input of AND gate 711g; an input of AND gate 707g is coupled to an input of AND gate 712g and an input of AND gate 709g is coupled to an input of AND gate 714g. The UOHOL10 signal generated by inberter 705g is also coupled to an input of AND gate 709g and 714g and is utilized to hold information in the UO register 512. X00 represents a ground, whereas XNU means unused input.

FIG. 7f is a detailed logic block diagram of UP register 501. It is similar to FIG. 7g described supra except that different signals from different destinations and different sources are applied.

Referring now to FIG. 7h there is shown the detailed logic block diagram of UM register 502. AND gate 701h-704h are OR'ed together to produce the UMHOL10 hold signal via inverter 705h. AND gates 706h-709h are OR'ed together and are coupled to the input of AND gate 704h in order to extend the range of signals that may be applied to produce the UMHOL10 hold signal. Similarly AND gates 711h-714h are OR'ed together and coupled to the input of AND gate 723h in order to extend the range of signals that may be applied to flip-flop 730h; and also AND gates 716h-719h are OR'ed together and are coupled to the input of AND gate 727h in order to extend the range of signals applied to flip-flop 731h. A line 740h for applying the PDA signals to flip-flop 730h and 731h is coupled at point 734h and 735h respectively. The input of AND gate 703h is also expanded to provide two further inputs URN1F00 and IRNUM10 by coupling the output of amplifier 733h to the input of AND gate 703h.

Referring now to FIGS. 7c-7e there is shown detailed logic block diagrams of write exception control logic 590, IFU subcommand control logic 591, and read violation exception control logic 592 respectively. Referring first to FIG. 7c there is shown flip-flops 705c and 710c which correspond to flip-flops 541 and 540 respectively. Under a micro-operation URW2F10 subcommand the information in flip-flop 710c is transferred to flip-flop 705c. The UWV1H10 hold signal is utilized to hold the information transferred to flip-flop 710c, whereas the UWV2H10 signal is utilized to hold the information transferred to flip-flop 705c. Similarly in FIG. 7d information is transferred from flip-flop 710d to flip-flop705d under micro-operation signal URNSW10, and in FIG. 7e information from flip-flop 710e is transferred to flip-flop 709e under control of micro-operation signal URW2F10.

Referring now to FIGS. 8a, 8b, and 8d there is shown detailed logic block diagrams of UWV logic 506, UWEP logic 507, and UMR logic 505 respectively. Referring first to FIG. 8a there is shown logic for generating a high signal when one of the test conditions 510 is true and also for generating the execute violation signal when the contents of UW register is less than or equal to the contents of UM register is less than or equal to the contents of UV register is not true. When the signal UWLEV10 is generated it indicates that the contents of UW register 504 is less than or equal to the contents of UV register 503. The logic for generating this signal was derived pursuant to the following Boolean expression:

$$X_1 = (B\overline{CD}) + (AB\overline{D}) + (A\overline{C})$$

Where $X_1$ represents the output of amplifier 805a and the various letters of the expression represent different input terminals of AND gates 801a-804a.

An indication that the contents of UV register 503 is greater than or equal to the contents of UM register 502 is had when UVGEM10 signal is generated. This signal is generated via inverter 820a in response to various inputs on AND gates 816a-819a which are OR'ed together and coupled to the input of inverter 820a. The logic for generating the UVGEM10 signal is made pursuant to the following Boolean expression:

$$X_2 = \overline{(B\overline{C}\overline{D}) + (AB\overline{D}) + (A\overline{C})}$$

An indication that the contents of UM register 502 is greater than or equal to the contents of UV register 503 is indicated by generating signal UMGEV10 via inverter 810a in response to the various inputs of AND gates 806a-809a which are OR'ed together. The logic for generating this signal is derived from the following Boolean expression:

$$X_3 = \overline{(B\overline{C}\overline{D}) + (AB\overline{D}) + (A\overline{C})}$$

(Wherein $X_3$ is the generated output signal).

Similarly the UVEQM10 signal is generated pursuant to the following Boolean expression:

$$X_4 = (A\overline{C}) + (\overline{A}C) + (B\overline{D}) + (\overline{B}D)$$

Generation of the UVEQM10 signal indicates that the contents of the UV register 503 is equal to the contents of the UM register 502.

The generation of the UMGEW10 signal indicates that the contents of the UM register 502 is greater or equal to the contents of the UW register 504 and is generated pursuant to logic having the following Boolean expression:

$$X_5 = \overline{(B\overline{C}\overline{D}) + (AB\overline{D}) + (A\overline{C})}$$

Generation of the UMGTW10 signal indicates that the contents of UM register 502 is greater than the contents of UW register 504 and this signal is generated by logic defined by the following Boolean expression:

$$X_6 = (AB\overline{D}) + \overline{C}(B\overline{D} + A)$$

The generation of the UWGMV00 signal indicates that the contents of UW register less than or equal to the contents of UM register less than or equal to the contents of UV register is not true. It is obtained when the UVGEM10 signal indicating that the contents of UV register is greater than or equal to the contents of the UM register, and the UMGEW10 signal indicating that the contents of the UM register is greater than or equal to the contents of the UW register are both high.

Referring now to FIG. 8b a UMEQP10 signal is generated by logic derived from the following Boolean expression:

$$X_7 = (A\overline{C}) + (\overline{A}C) + (B\overline{D}) + (\overline{B}D)$$

When this signal is high it indicates that the contents of UM register 502 is greater than the contents of UP register 501.

Referring to FIG. 8d there is shown the detailed logic block diagram for performing the operations of UMR logic 505 shown on FIG. 5. One of the operations of this logic is to determine the maximum value of the contents of UP register 501 and of bits 2 and 3 of UBS logic 606. In order to do this there must be an indication whether contents of UP is less than the contents of UBS or the contents of UP is greater than the contents of UBS. The generation of UPLEB10 signal indicates that the contents of UP register 501 is less than or equal to bits 2 and 3 of UBS logic 606; whereas the generation signal UPGTB10 indicates that the contents of UP register 501 is greater than bits 2 and 3 of UBS logic 606. These signals are generated by logic which has been defined by the following Boolean expression:

$$X_8 = \overline{(B\overline{C}\overline{D}) + (AB\overline{D}) + (A\overline{C})}$$

Where $X_8$ is the output of inverter 805d and the letters of the expression are various inputs of the AND gates 801d-803d.

To illustrate how the maximum value of the contents of UP register and UBS logic may be determined by the output signals UMPB010 and UMPB110 of amplifier 814d and 817d respectively, assume first that the contents of register UP are less than or equal to bits 2 and 3 of UBS logic because bit 2 is 1 and bit 3 is 1 whereas UB register contains 01. This is indicated by the signal UPLEB10 being high and the signal UPGTB10 being low since it is the inverse of signal UPLEB10. This high UPLEB10 signal is applied to one input of AND gate 813d and also one input of AND gate 806d. If bit 2 of UBS logic is a 1 as indicated by signal UBS0210 then AND gate 813d is enabled and signal UMPB010 goes high and indicates that bit 2 on UBS logic is a 1. Moreover if bit 3 of UBS logic is a 1 indicated by input signal UBS0310 being applied as another input of AND gate 816d then AND gate 816d is enabled and signal UMPB110 is high or a 1. Therefore under the assumed conditions where bits (2,3) UBS logic is greater or equal to the contents of UP register the maximum value of the two quantities is in UBS, and its number is binary 11 or decimal 4. Hence it is seen how a comparison is first made to determine which hardware contains the maximum, and then a determination is made as to the value of that maximum. By similar analysis one may see how the value of the UP register may be determined by signals UMPB010 and signals UMPB110 when the contents of UP register is greater than the second and third bit of UBS logic. Similarly the maximum value of UM register 502 or UV register 503 may be determined by signals UVGEM10 and UMGTV10 respectively, when UV register 503 is greater than or equal to UM register 502, and conversely when UM register 502 is greater than UV register 503.

Referring now to FIGS. 9a-9i a legend of symbols utilized in FIGS. 7 and 8 is shown. FIG. 9a shows the symbol when there is a connection internally within the logic board. FIG. 9b illustrates an output pin connection. FIG. 9c indicates an input pin connection and is generally a source outside of the logic board illustrated. FIG. 9d is the symbol utilized for an AND gate. FIG. 9e is the symbol utilized for an amplifier; whereas FIG. 9f is the symbol utilized for an inverter. FIG. 9g illustrates three AND gates 901g-903g that are OR'ed together thus causing output 904g to go high when any one of AND gates 901g-903g is high. FIG. 9h shows the symbol of a flip-flop having a 00 reset terminal and a 10 set terminal. A PDA line supplies the clock pulse for causing the flip-flop to switch states when other conditions are present on the flip-flop. FIG. 9i represents a microoperation control signal.

RING CHECKING AND RING CROSSING

Figure 10:
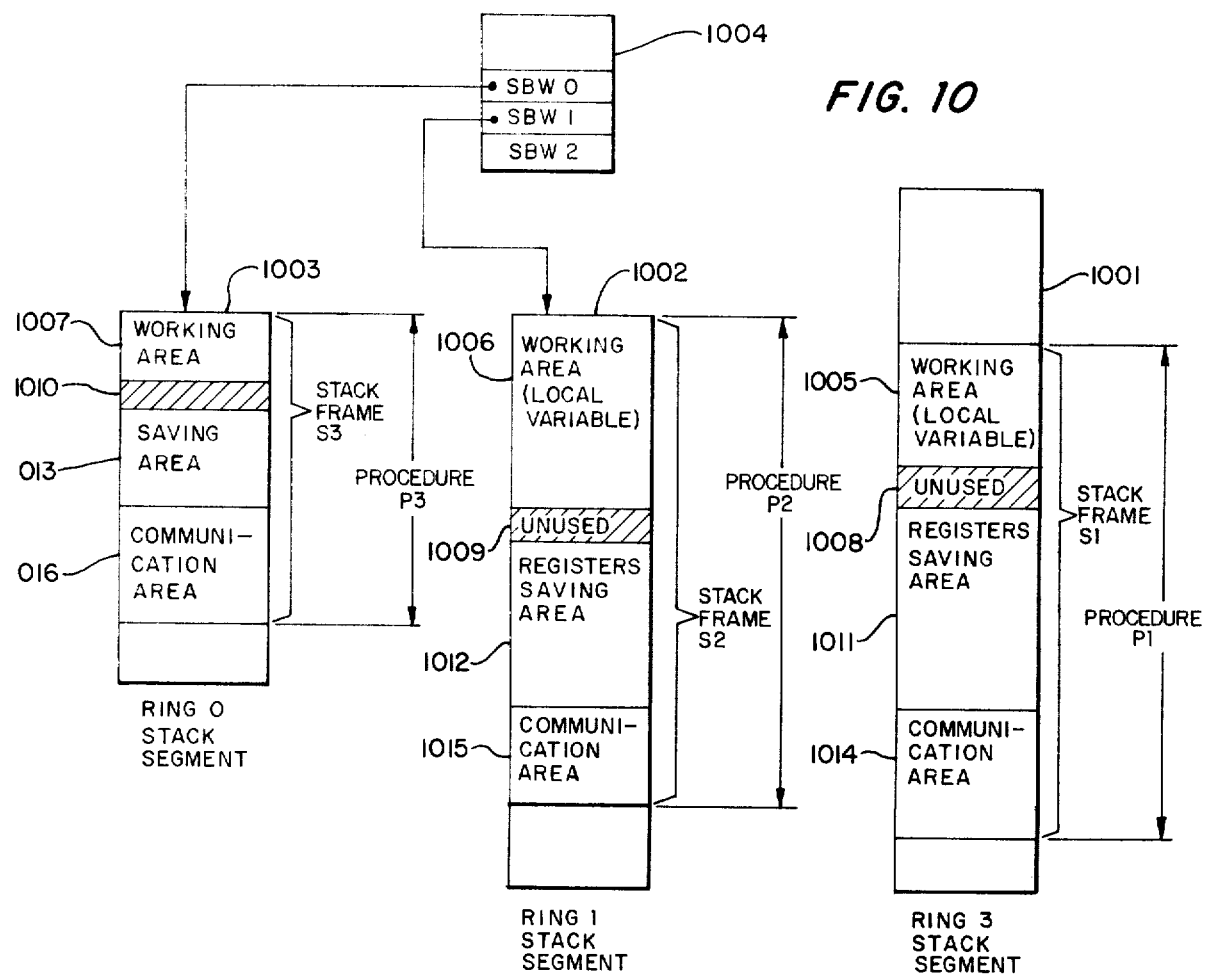
FIG. 10 is a schematic diagram of three stack segments, one each for ring 0, 1 and 3 respectively.

In order to enforce the ring protection scheme between procedures executing in different rings, the invention employs push-down stacks for its procedure linkage mechanism wherein a portion of each stack called a stack frame is dynamically allocated to each procedure. Different stack segments are used for each ring with one stack segment corresponding to one ring. Thus when a procedure is executed in ring RN its stack frame is located in the RN stack segment. Referring to FIG. 10 there is shown three stack segments 1001-1003, with each stack segment having stack frames S1-S3 respectively. Ring 3 is assigned to stack segment 1001, ring 1 is assigned to stack segment 1002 and ring 0 is assigned to stack segment 1003. Within each stack segment there is a procedure P1 associated with stack frame S1 of segment 1001, a procedure P2 associated with stack frame S2 of stack segment 1002 and a procedure P3 associated with stack frame S3 of stack segment 1003. The segmented addresses (i.e. segment number and segment relative address SEG, SRA) of the first bytes of the stack segments for rings 0, 1 and 2 respectively are located in stack base words SBWO-SBW2 respectively which are in turn located in process control block 104. (For further information on process control blocks see above referenced application on PROCESS CONTROL BLOCK.) Since the ring 3 stack segment can never be entered by an inward call (i.e. from a ring higher than ring 3) its stack starting address is not needed. Each stack frame S1, S2, S3 is divided into a working area 1005, 1006, 1007 respectively; an unused portionn 1008, 1009, 1010, which is utilized for alignment purposes; a register saving area 1011, 1012, and 1013; and a communication area 1014, 1015, and 1016 respectively. The working area is utilized by its procedure as needed and may contain material required by the process such as local variables, etc. The saving area of the stack frame is utilized to save the contents of various registers such as the status register, the T-register and the instruction counter contents ICC. The communications area stores information which is needed to pass parameters between procedures. Prior to a call to a given procedure the user saves those registers he wishes saved and moreover loads into the communication area the parameters to be passed to the called procedure. When the call is made, the hardware saves the contents of the instruction counter and other specified registers to facilitate a return from the called procedure. Each procedure call creates a stack frame within a stack segment and subsequent procedure calls create additional frames. Hence a stack is created and consists of a number of contiguous parts called stack frames which are dynamically allocated to each procedure. These stacks reside in stack segments. Generally the first stack frame is loaded into the beginning of the segment and succeeding frames are loaded after it. The last frame loaded is considered the top of the stack. A T-register 114 on FIG. 1, locates the top of the stack for the currently active process. A procedure such as for example P1 which is executing in ring 3 may call a procedure P2 executing in ring 1 which in turn calls a procedure P3 which is now executing in ring 0. As each procedure is called it creates within its ring stack segment a stack frame (i.e. defining the environment for the procedure execution) and the T-register 114 is loaded which gives the address of the top of the stack for the currently active process. The procedure P1 (as previously assumed) may call procedure P2 which in turn may call procedure P3 and since these calls are from a higher ring number to a lower ring number a ring crossing entailing an inward call is required and is accomplished in a manner to be described infra. During each change of procedure the necessary registers and parameters are saved in order to facilitate a return from the called procedure. (For further details see above identified patent application on Stack Operations and Procedure Calls).

Figure 13:
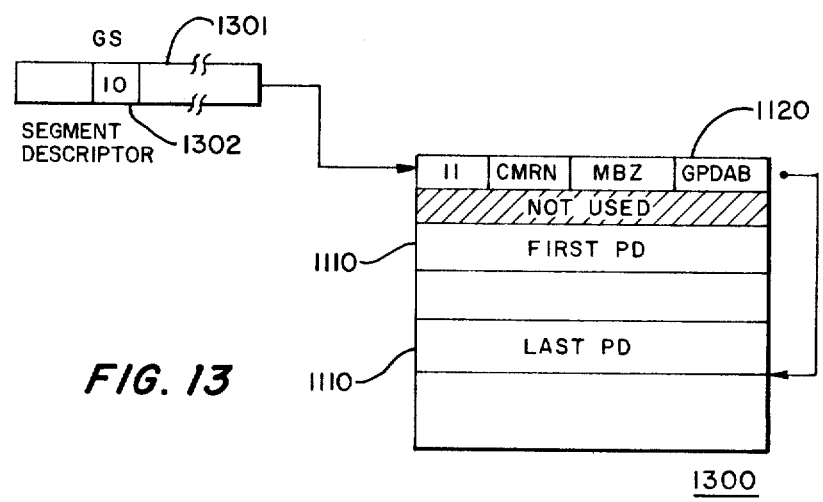
FIG. 13 schematically shows a segment descriptor and the segment containing procedure descriptors.
Figure 11A:
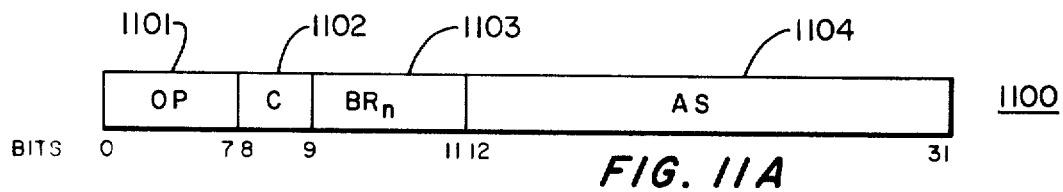
FIG. 11A shows the format of the Enter Procedure instruction.
Figure 11B:
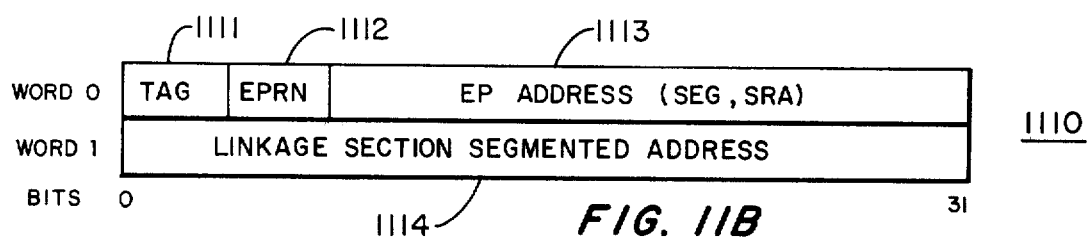
FIG. 11B shows the format of a procedure descriptor.
Figure 11C:
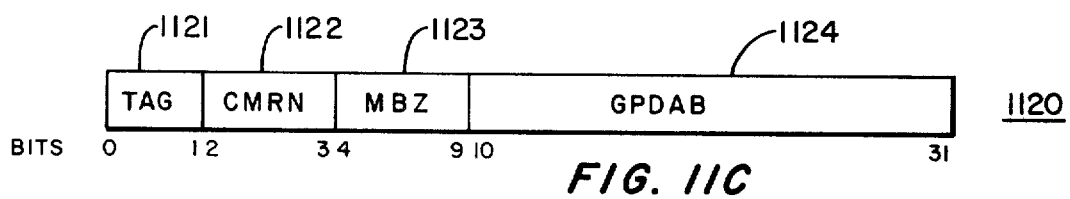
FIG. 11C shows the format of a gating procedure descriptor GPD the first word of the segment containing the procedure descriptors.

A procedure is always accessed through a procedure descriptor 1110 by means of the ENTER PROCEDURE INSTRUCTIONS. The format of the ENTER PROCEDURE INSTRUCTION 1100 is shown on FIG. 11a. The operation code (OP) 1101 occupies bit positions 0 through 7. The complementary code 1102 is a one bit code and occupies bit position 8 to 9; if the complementary code is set to logical 1 the instruction is ENT, whereas if the complementary code is logical 0 the instruction is ENTSR and the base register must be base register 0 (BRO). The address syllable AS 1104 occupies bit positions 12 thru 31 and provides the address syllable As of the procedure descriptor 1110. When an ENTER PROCEDURE INSTRUCTION requires a ring crossing a gating procedure descriptor 1120 is obligatorily accessed. This is indicated by the GS field 1302 of segment descriptor 1301 being set to logical 10. Generally the GS field is set to 10 when one of the ENTER PROCEDURE INSTRUCTIONS is utilized. The segment descriptor is utilized to point to the base of the segment desired, in this instance the segment 1300 containing gate procedure descriptors GPD 1120. The first word of the segment 1300 containing the gating procedure descriptors (GPD's) is formatted as shown in FIG. 11c. The TAG 1121 occupies bit positions 0 and 1 and must indicate a fault descriptor i.e. the TAG field must be set to logical 11. The Caller's Maximum Ring Number CMRN 1122 occupies bit positions 2 and 3, and indicates the maximum ring from which a calling procedure through the gated procedure descriptor GPD is legal. A call violation exception is generated if the caller's ring number is greater than CMRN 1122. The gated procedure descriptor address boundary GPDAB 1124 occupies bit positions 10 through 31 and it must be greater than the segment relative address SRA (i.e. the GPD's displacement in the segment of procedure descriptors 1300), otherwise an illegal GPD access exception occurs. Thus a gating procedure descriptor GPD is utilized as the first word of the segment containing procedure descriptors and is utilized to determine whether the caller has a right to access the segment via the caller's maximum ring number CMRN and whether or not the procedure descriptor called is within the gating procedure descriptor's address boundary. Once it is determined that there is a legal call to the segment and the caller has a right to enter the segment the address is obtained from the address syllable AS 1104 of enter instruction 1100 and the required procedure descriptor 1110 (see also FIG. 13) is accessed. The format of procedure descriptor 1110 is shown on FIG. 11b and is comprised of two 32 bit words—word 0 and 1 respectively. Word 0 contains the segmented address 1113 of the entry point EP of the procedure desired. The segmented address, as is the case with the segmented address of any operand, is comprised of the segment number SEG and the segment relative address SRA. Word 0 of the procedure descriptor includes an entry point ring number EPRN 1112 and a TAG field 1111. The value of the TAG is interpreted as follows:

a. if the TAG contains logical 00 the procedure descriptor is direct;

b. if the TAG is logical 01 the procedure descriptor is an extended descriptor and includes word 1 making a total of two words;

c. if the TAG is logical 10 the procedure descriptor is indirect and an illegal procedure descriptor exception occurs; and, d. if the TAG is logical 11 it is a fault procedure descriptor and an exception occurs.

Word 1 of the procedure descriptor is 32 bits long and is utilized when the TAG indicates an extended descriptor and contains the segmented address of a linkage section whose contents are loaded in base register BR 7 at procedure entry time.

Figure 12:
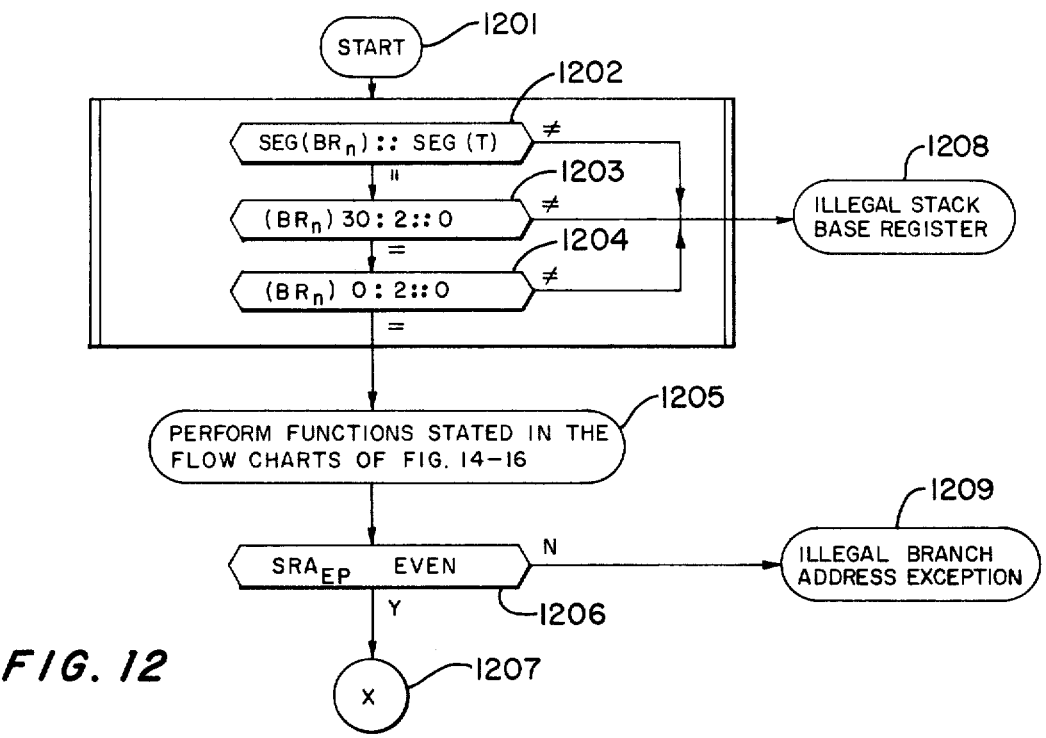
FIG. 12 is a flow diagram of a portion of the Enter Instruction pertaining to ring crossing and ring checking.
Figure 14:
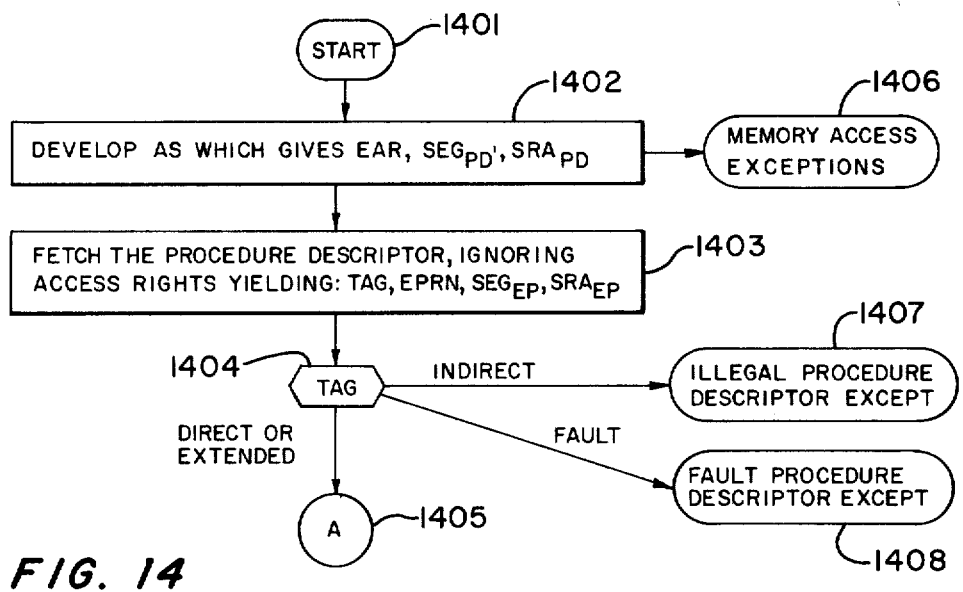
FIGS. 14-16 are flow diagrams showing various operations that are performed when the Enter Procedure instruction is executed.
Figure 15:
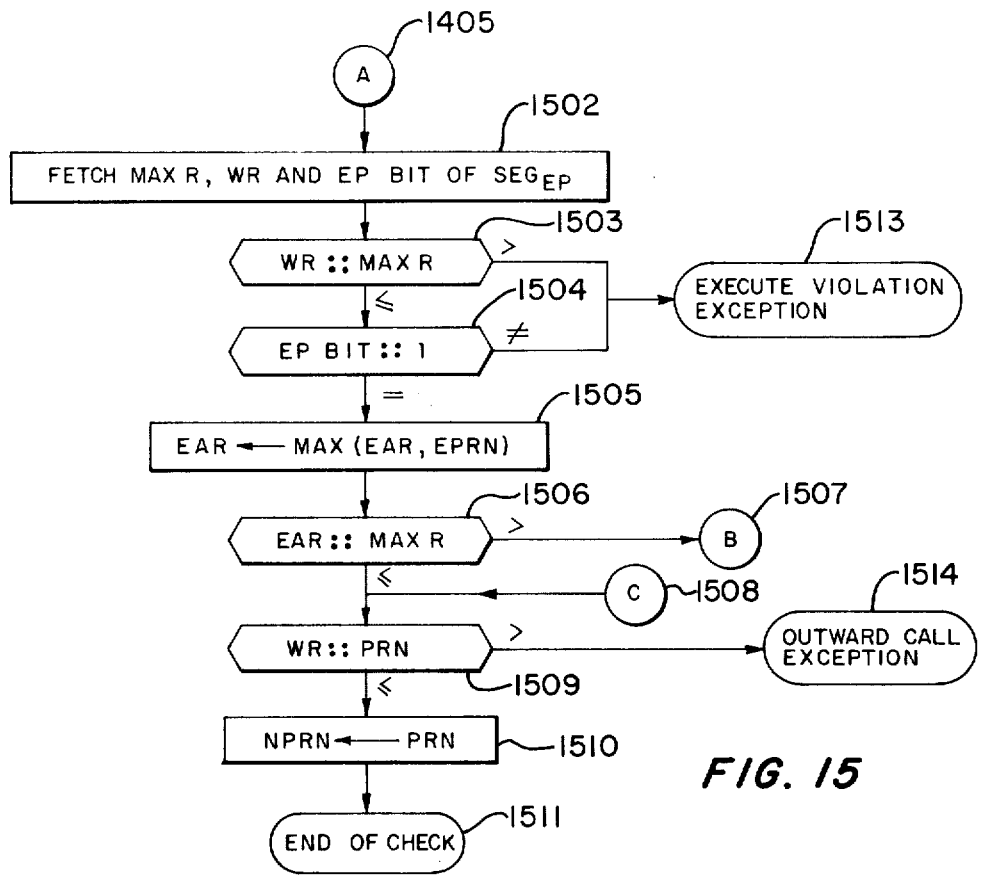
Figure 16:
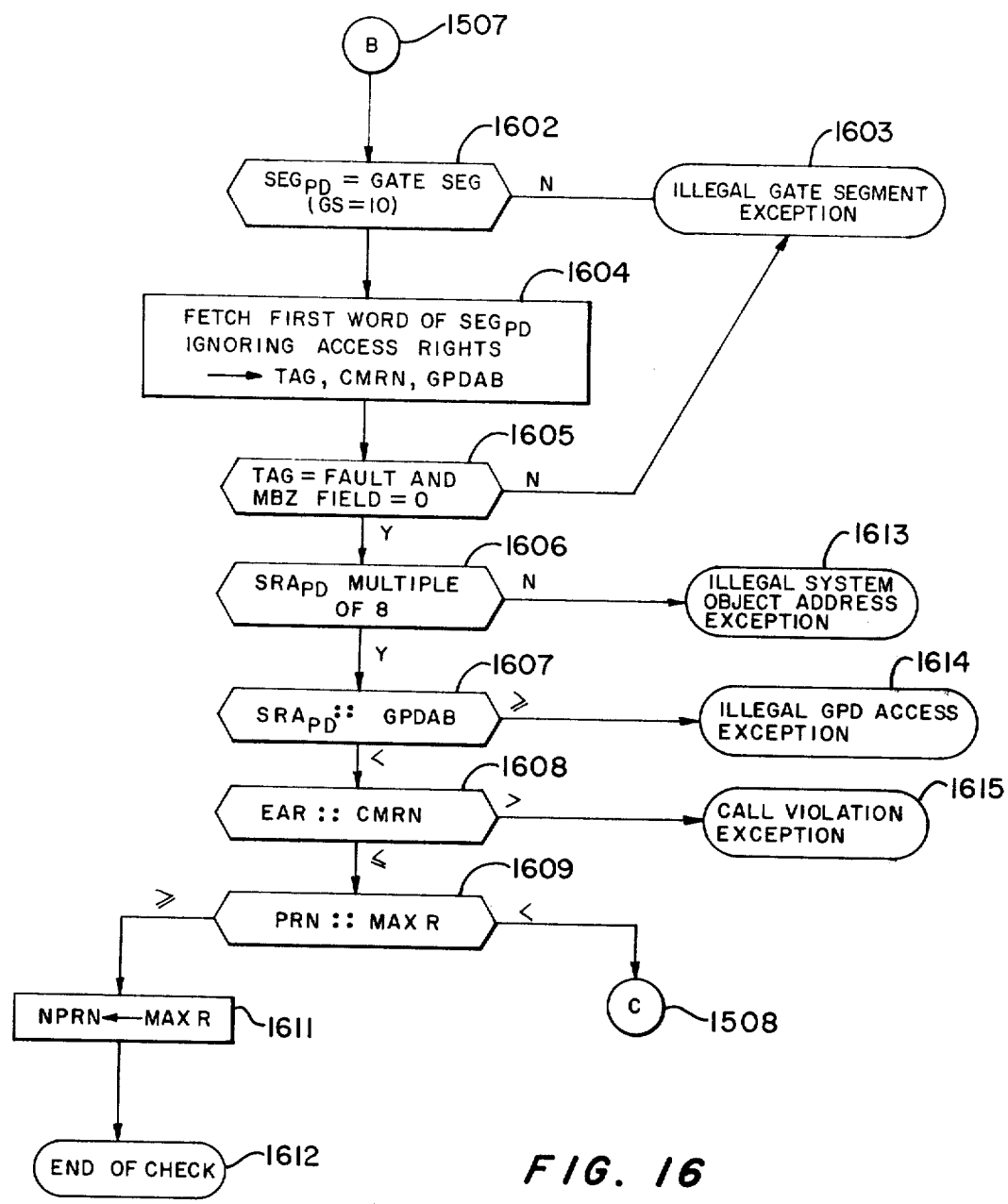

Referring to FIG. 12 a portion of the ENT instruction is shown and more specifically that portion which pertains to the ring crossing and ring checking requirements. The ENT instruction is called, 1201 and a comparison is made 1202 wherein the segmented part of the base register BRn is compared to the segmented part of the address of the T register, and if they are not equal an illegal stack base register 1208 is indicated. If on the other hand they are equal another comparison 1203 is made wherein the 30th bit including the next two bits (i.e. bits 30 and 31) of base register n, BRn is compared to 0 and if it is not equal to 0, then once again an illegal stack base register 1208 is indicated. If it is equal to 0 it indicates that the contents of BRn is aligned with respect to the word boundary and another comparison 1204 is performed to determine that the TAG of BRn (i.e. the two bits starting from bit 0) is equal to 0. A TAG having a logical 0 indicates information is accessed via a direct descriptor which is one of the requirements of the ENT instruction. If the TAG (i.e. bits 0 and 1 of BRn) is equal to 0 then the functions stated in flow charts of FIGS. 14 through 16 are performed (see flow chart FIG. 12 block 1205). If these meet the necessary requirements a further check 1206 is made to determine whether the segment relative address of the entry point which was given (SRA$_{EP}$) is even, because instructions start on a half-word boundary. If it is not even then an illegal branch address exception is generated 1209 however if it is legal the ENT instruction is executed 1207 via further steps not shown.

Referring now to the flow charts of the access checking mechanism FIGS. 14-16, generally the following operations are performed each time the instruction ENTER PROCEDURE is issued:

a. the caller's right to call the callee is checked by first determining from the second word of the segment descriptor the call bracket in which the caller is executing. (The call bracket is determined by taking the minimum ring number from the write ring number field WR and the maximum ring number from the maximum ring number field MAXR).

b. a decision is made about the next process ring number by determining whether the caller is in the same call bracket as the callee, which implies don't do anything; whether the caller is in a call bracket requiring that he make an outward call in which case an exception condition is generated which is handled by a mechanism not described herein; or finally whether caller is in a call bracket which requires an inward call (i.e. going to a call bracket which requires ring crossing from a larger ring number to a smaller ring number in which case the ring crossing must be at a valid entry point EP and the entry point must be validated).

c. a stack frame is created for the callee (i.e. space in the aforementioned format of the appropriate segment is allocated), and the stack frame and the stack frame registers are updated;

d. a branch to the entry point of the procedure pointed to by the procedure descriptor is performed.

Referring now to FIG. 14 the access checking is started 1401 by obtaining the address syllable AS containing the effective address ring number EAR, the segment number of the procedure descriptor SEG$_{PG}$, and the segment relative address of the procedure descriptor SRA$_{PD}$. Having developed this information the procedure descriptor 1110 is fetched 1403 from (SEG$_{PD}$, SRA$_{PD}$) ignoring access rights to scratch pad memory. The procedure descriptor 1110 will yield the TAG which determines whether the descriptor is direct, extended, indirect, or a fault descriptor; the entry point ring number EPRN; the segment (SRA$_{EP}$) which contains the entry point and the segment relative address (SRA$_{EP}$) of the entry point. The TAG is tested 1404 to determine whether the descriptor 1110 is direct, extended, indirect or a fault descriptor by checking its field in accordance to the code hereinbefore described. Only a direct or extended procedure descriptor is legal. An indirect or fault descriptor is illegal and upon access invokes an exception mechanism not herein described. Once it is determined that a legal procedure descriptor has been accessed the actual call right checking begins at point A 1405.

Referring now to FIG. 15 and continuing from point A 1405 the maximum ring number MAXR, the write ring number WR, and the execute permission bit E of the segment containing the entry points SEG$_{EP}$ are fetched; this information is contained in the segment descriptor for the segment containing the entry points (SEG$_{EP}$). The write ring number WR is compared to the maximum ring number MAXR 1503 and if the write ring number WR is greater than the maximum ring number MAXR the segment is nonexecutable and an execute violation exception 1513 occurs. If the write ring number WR is less than or equal to the maximum ring number MAXR then the execute permission bit EP is compared to logical 1 and if the EP bit is not logical 1 then once again an execute violation exception 1513 occurs; however if the EP bit is equal to one the effective address ring number EAR of the calling procedure is maximized with EPRN to give a new EAR$_2$,—[Max (EAR$_1$ EPRN)] where EAR, is the maximum of PRN as found in the instruction counter IC, and all ring numbers in base registers and data descriptors, in any, found in the path which leads to the procedure descriptor. The effective address ring number EAR$_2$ is then compared 1506 to the maximum ring number MAXR of the MAXR segment descriptor of SEG$_{EP}$ which is the maximum ring number at which a procedure may execute. If EAR$_2$ is greater than MAXR the procedure call is an inward call which requires that the procedure be entered by a valid entry point and the access checking operation branch to point B 1507. The following checking operations are then performed:

a. the SEG$_{EP}$ is checked to determine if it is a legal gate segment; and, b. the caller's maximum ring number CMRN is checked to determine if it is greater than or equal to the effective address ring number EAR of the caller.

If these conditions are not true then an illegal gate segment exception 1603 or call violation exception 1615 occurs.

Referring now to branch point B 1507 of FIG. 16 the first check 1602 that is made is to determine whether or not the segment which contains the procedure descriptors is a gate segment. This is done by examining the Gating/Semaphore field GS of the segment descriptor pointing to the segment of procedure descriptors, to determine if it is set to logical 10. If the GS field of the segment descriptor of the segment containing procedure descriptors is set to 10 it is then a gate segment and the first word of the segment containing procedure descriptors is a gated procedure descriptor GPD 1120 of FIG. 11C and FIG. 13. The first word 1120 of the segment containing procedure descriptors is then fetched from address SEG$_{PD}$, 0 ignoring access rights to scratch pad memory. It will be noted that the TAG field of the first word 1120 of the segment containing procedure descriptor SEG$_{PD}$ 1300 must be a logical 11 (FIG. 13) which indicates it is a fault descriptor. Moreover the MBZ field must be set to zero. These conditions are checked by hardware/firmware (arithmetic logic unit) step 1605 and if these conditions do not hold an illegal gate segment exception 1603 results. However if these conditions do hold a check 1606 is further made to determmine that the segment relative address of the procedure descriptor SRA$_{PD}$ 1110 is a multiple of 8. If the condition of step 1606 does not hold an illegal system object address exception 1613 results otherwise the next step 1607 is performed. Step 1607 checks to determine whether or not the segment relative address of the procedure descriptor SRA$_{PD}$ is within the address boundary GPDAB 1124 of the gated procedure descriptor 1120; if it is not within that address boundary it is an illegal procedure descriptor and an illegal GPD gated procedure descriptor access exception 1614 occurs. However if it is within the address boundary of the gated procedure descriptor (i.e. SRA$_{PD}$ is less than GPDAB) then the caller's right to call the callee is checked 1608. This is performed by comparing the effective address ring number EAR$_2$ to the caller's maximum ring number CMRN 1122 as found in the first word 1120 of the segment of procedure descriptors 1300. If EAR$_2$ is greater than the caller's CMRN a call violation exception 1615 occurs which indicates that the caller in this particular instance has no right to legally call inward i.e. from a higher ring number to a lower ring number. On the other hand if EAR$_2$ is equal or less than CMRN, then the inward call is legal and a check is made 1609 to determine that the process ring number PRN which is the current process ring number found in the instruction counter IC just before the call was made is less than the maximum ring number MAXR of SEG$_{EP}$, and if it is the accessing mechanism branches to point C 1508, otherwise a new process ring number NPRN is calculated and set to a maximum ring number MAXR 1611. Generally the effective address ring number EAR$_2$ is the same as the process ring number PRN of the caller. Sometimes however, in cases where it is necessary to give maximum assurance that the caller will not be denied access to a given segment the EAR$_2$ is greater than the PRN. In those cases PRN is forced to take the value of EAR$_2$ in order to make sure that the call is returned to the maximum ring number upon an exit. To this point it will be noted that this checking mechanism was invoked because the EAR$_2$ was greater than the MAXR hence greater than the top of the call bracket of the procedure and hence an inward call was necessary which necessitated going through a valid gate, and the mechanism included these gating checks. By branching back to C 1508 (FIG. 15) a further check 1509 is made to determine then that the process ring number PRN is greater than the write ring number WR of SEG$_{EP}$ which in this context is the minimum ring number at which a procedure may execute. If the write ring number WR is greater than the process ring number PRN an outward call exception 1514 occurs. However if WR is less than or equal to PRN the call is legal and NPRN is set to PRN 1510.

Having made the above checks the inward call is made, and after performance of the desired operation a return back to the original point of the program in execution is made by the EXIT INSTRUCTION. During the ENTER INSTRUCTION the instruction counter IC was saved in the saving area of the caller's stack frame before making the call. Moreover the caller's ring number was also saved during the ENTER INSTRUCTION and this was saved in base register 0 BR0.

Figure 11D:
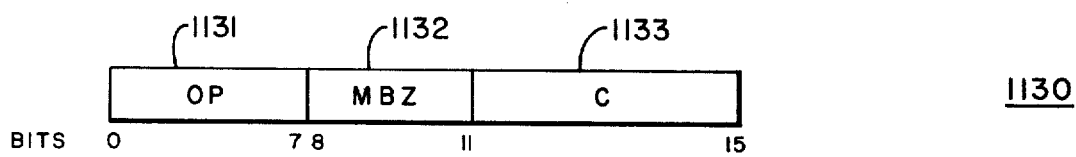
FIG. 11D shows the format of the Exit Procedure instruction.

The format of the EXIT INSTRUCTION 1130 is shown on FIG. 11D. The operation code OP 1131 is found in bit positions 0-7 and the complementary code C 1133 is found in bit positions 12-15. The complementary code allows other instructions to use the same 8 bit op code. The MBZ field 1132 in bit position 8-11 must be 0 otherwise an illegal format field exception occurs. (BR0 is generally a pointer to the communications area of the caller's stack frame).

Figure 17:
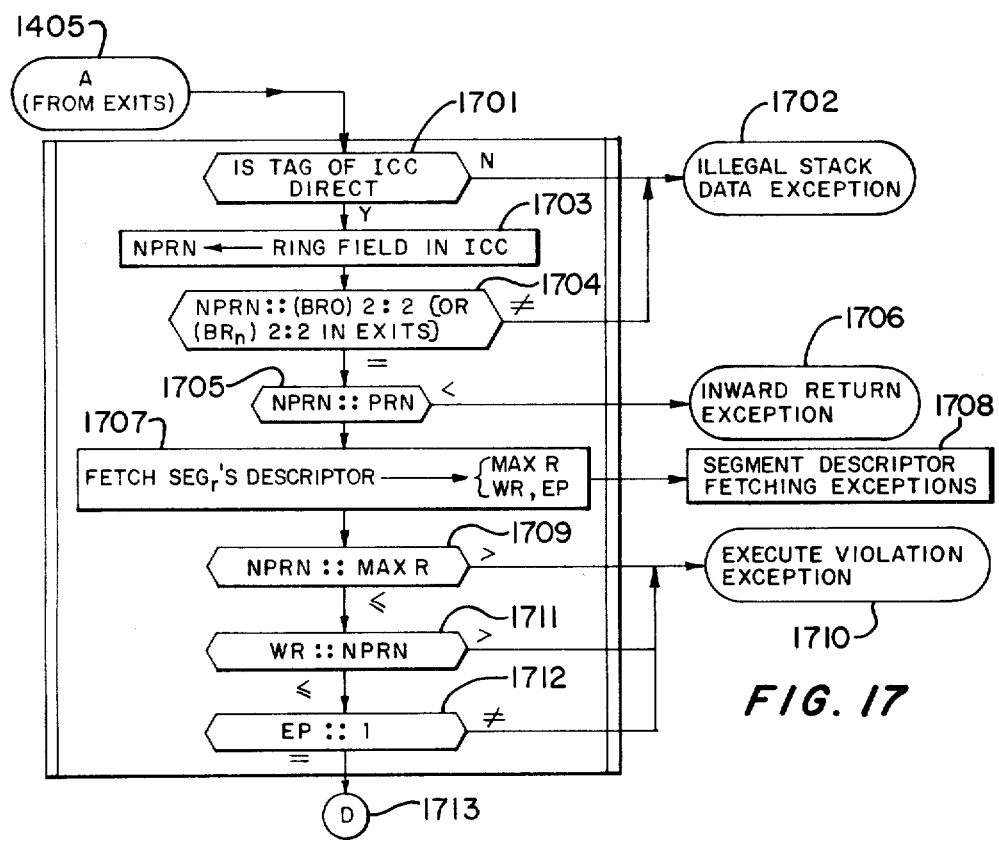
FIG. 17 is a flow chart of the Exit instruction.

In performing the EXIT INSTRUCTION it is necessary to perform predetermined checks in order to ascertain that the caller didn't change his image which would permit him to operate at a different privilege than was intended. Referring to FIG. 17 the first check performed 1701 is to determine if the TAG of the instruction counter content (ICC) indicates a direct descriptor. A logical 00 in the TAG field indicates that it is direct if it is not an illegal stack data exception 1702 occurs, whereas if it is equal to 0 the ring field in the instruction counter content ICC is set to the new process ring number NPRN 1703. This sets the new process ring number NPRN to what it used to be when the call was first made. However further checks are made in order to ascertain that there was no further cheating. Hence the base register 0 ring number located at bit position 2 and extending for 2 bit positions from and including bit position 2 must be equal to the new process ring number NPRN 1704. (It will be recalled that when the ENTER INSTRUCTION was called the ring number of the caller before the call was made was stored in bits 2 and 3 of base register 0, BR0). If check 1704 indicates that the new process ring number NPRN is not equal to the ring number in bit positions 2 and 3 of base register 0 (BR0) an illegal stack data exception 1702 occurs. The next check 1705 determines whether an inward or an outward return must be performed. Since an inward call was previously performed an outward return is implied in order to reach the original point from which the procedure was called. Moreover since the invention does not permit an outwward call there is never a necessity to return inward. Hence the new process ring number NPRN is compared to the process ring number PRN 1705, and if NPRN is less than PRN an inward return is implied and an inward return exception 1706 is generated. However if check 1705 is passed successfully (i.e. NPRN is greater or eqqual to PRN) then a check is made to determine that a return is made to the segmented address SEGr that called the procedure and a return to the call bracket of the calling procedure is made and moreover that the execute bit EP is set. This is performed by fetching the segment descriptor SEGr of the calling procedure 1707 and making checks 1709, 1711, 1712. In performig checks 1709, 1711, 1712, check 1709 and 1711 determine that the new process ring number NPRN is greater than the minimum ring number WR but less than the maximum ring number MAXR (i.e. that the ring number is in the call bracket of the calling procedure where it should be). Finally check 1712 makes sure that the execute permission bit EP is set to 1. Thus a full cycle is concluded a call was performed via an ENTER INSTRUCTION; the required operation or processing was performed via the called procedure; then a return via an EXIT INSTRUCTION to the calling procedure was performed.

Having shown and described the preferred embodiment of the invention, those skilled in the art will realize that many variations of modifications can be made to produce the described invention and still be within the spirit and scope of the claimed invention.

GLOSSARY OF TERMS

JOB

The job is the major unit of work for the batch user. it is the vehicle for describing, scheduling, and accounting for work he wants done.

JOB STEP

A smaller unit of batch work. It is generally one step in the execution of a job consisting of processing that logically belongs together.

TASK

The smallest unit of user-defined work. No user-visible concurrency of operation is permitted within a task.

PROGRAM

A set of algorithms written by a programmer to furnish the procedural information necessary to do a job a part of a job.

PROCESS GROUP PLEX

The system's internal representation of a specific execution of a job.

PROCESS GROUP

A related set of processes, usually those necessary for performance of a single job step.

PROCESS

The controlled excution of instructions without concurrency. Its physical representation and control are determined by internal system design or convention.

PROCEDURE

A named software function or algorithm which is executable by a computational processer without concurrency. Its physical representation (code plus associated information, invocation, and use are determined by internal system or designed convention).

LOGICAL PROCESS

The collection of hardware resources and control information necessary for the execution of a process.

ADDRESS SPACE (SEGMENTATION)

The set of logical addresses that the CPU is permitted to transform into absolute addresses during a particular process. Although a processor has the technical ability of addressing every single cell of timing memory, it is desirable to restrict access only to those cells that are used during the process associated with the processor.

LOGICAL ADDRESS

An element of the process address space such as for example segment number SEG and Displacement D.

BASIC ADDRESS DEVELOPMENT

A hardware procedure which operates on a number of address elements to compute an absolute address which is used to refer to a byte location in core.

PROCESS CONTROL BLOCK

A process control block PCB, is associated with each process and contains pertinent information about its associated process, including the absolute address of tables defining the segment tables the process may access.

J.P. Tables a collection of logical addresses for locating a process control block associated with a process.

$SEG_{PD}$

The segment which contains the procedure descriptor.

$SEG_{EP}$

The segment which contains the entry point, as found in the procedure descriptor.

PRN

The process ring number, found in the instruction counter IC just before the call, or calculated by the ENTSR instruction.

EAR

The effective address ring number which is the maximum of:

(a) the process ring number PRN as found in the IC; or, (b) all ring numbers in the base register and data descriptors (if any) found in the path which leads to the procedure descriptor from the call instruction, including the entry point ring number EPRN located in the procedure descriptor itself.

MAXR

The maximum ring number at which a procedure may execute; MAXR is found in the segment descriptor of $SEG_{EP}$.

WR

The minimum ring number at which a procedure may execute; WR is found in the segment descriptor of $SEG_{EP}$.

EP

Execution perbit found in the segment descriptor of $SEG_{EP}$.

CMRN the caller's maximum ring number, as found in the first word of the segment $SEG_{PD}$ if this segment is identified as a gate segment (i.e. with the code "gate" set).

NPRN

New process ring number.

EPRN

Entry point ring number (found in the process procedure descriptor).

| | ADDENDUM | | |
|---|---|---|---|
| Signal Name | | Type | Function |
| (1) | WSCLR | Control | Clears register to which it is connected |
| (2) | PDARG | Control | Clock Signal PDA |
| (3) | PDURGIT | Connecting | Pin connected to PDA at |

ADDENDUM -continued

| Signal Name | | Type | Function |
|---|---|---|---|
| | | | one end and resister at the other |
| (4) | UWOBK | Connecting | Expands inputs to UW register |
| (5) | UWHOL | Control | Holds information in register to which it is connected |
| (6) | UW1BK | Control | Same as UWOBK but is connected to different input terminal of UW register |
| (7) | UW00000 | | Reset terminal of one flip-flop of register UW |
| (8) | UW00010 | | Set terminal of flip-flop of register UW |
| (9) | UW00100 UW00110 | | Same as 7 + 8 but different flip-flop |
| (10) | UVSPS | Control | Spare Control Input |
| (11) | UVSPD | Data | Spare Data Input |
| (12) | UVOBK | Expander | Same as UWOBK and UW1BK, but it connects different registers and gates |
| (13) | UV00000 UV00010 UV00100 UV00110 | | Same as UW00000, UW00010, UW00100, UW00110, but applies to flip-flop UV. |
| (14) | UWV1S | Control | Control input for UWV1F |
| (15) | UWV1D | Data | Data input for UWV1F |
| (16) | UWV2F | F/F | Write control flip-flop |
| (17) | UWV1S UWV2S | Control | Control input for UWV1F, UWV2F |
| (18) | UWV1D | Data | Data input for UWV1F |
| (19) | UWV1H | Control | Hold UWV1F flip-flop |
| (20) | UWV1C | Control | Clear UWV1F |
| (21) | UWV2C | Control | Clear UWV2F |
| (22) | URN1S URN2S | Control | Control inputs for URN1F, URN2F |
| (23) | URN1D | Data | Data Input for URN1F |
| (24) | URNSW | Control | Transfer URN1F to URN2F and URN2F to URN1F |
| (25) | URN2F | F/F | Control loading max(UP, UBS2,3, to UM) |
| (26) | URN1H | Control | Hold URN1F flip-flop |
| (27) | URN2C | Control | Clear URN2F |
| (28) | URW1S URW2S | Control | Control inputs for URV1F, URV2F |
| (29) | URW1D | Data | Data Input for URV1F |
| (30) | URV2F | F/F | Read control flop |
| (31) | XNU | | Indicates terminal not used herein |
| (32) | X00 | | Grounded Input |

What is claimed is:

1. In an automatic data processing apparatus for processing information, including a virtual memory having stored therein a plurality of different types of groups of information, each information group-type associated with an address space in said virtual memory bounded by a segment having adjustable bounds, said information being protected against unauthorized uses by a hierarchy of concentric ring levels (i.e. levels of privilege) wherein each group-type of information is associated with a predetermined ring number indicative of a level of privilege, said level of privilege decreasing as the associated ring number increases, an apparatus for generating a write-violation-exception signal comprising:

(a) first means for storing first information indicating the maximum ring number RD (i.e. minimum level of privilege) required to read invormation from said selected group;

(b) second means for storing second information indicating the maximum ring number WR (i.e. minimum level of privilege) required to write information into said selected group;

(c) third means for storing third information indicating the maximum ring number MAXR (i.e. minimum level of privilege) required to process information from said selected group;

(d) fourth means interconnecting said first, second and third means, for determining the maximum of the contents of said first, second and third means, whereby an effective address ring number EAR is generated;

(e) fifth means connected with said second means, for comparing the effective address ring number EAR with the write ring number WR; and, (f) sixth means connected with said fifth means for generating a write-violation-exception signal when EAR is greater than WR.

2. In an automatic data processing apparatus for processing information, including a virtual memory having stored therein a plurality of different types of groups of information, each information group-type associated with an address space in said virtual memory bounded by a segment having adjustable bounds, said information being protected against unauthorized uses by a hierarchy of concentric ring levels (i.e. levels of privilege) wherein each group-type of information is associated with a predetermined ring number indicative of a level of privilege, said level of privilege decreasing as the associated ring number increases, an apparatus for generating a read-violation-exception signal comprising:

(a) first means for storing first information indicating the maximum ring number RD (i.e. minimum level of privilege) required to read information from said selected group;

(b) second means for storing second information indicating the maximum ring number WR (i.e. minimum level of privilege) required to write information into said selected group;

(c) third means for storing third information indicating the maximum ring number MAXR (i.e. minimum level of privilege) required to process information from said selected group;

(d) fourth means interconnected with said first, second and third means, for determining the maximum of the contents of said first, second and third means, whereby an effective address ring number EAR is generated;

(e) fifth means connected with said first means, for comparing the effective address ring number EAR with the read ring number RD; and, (f) sixth means, connected with said fifth means, for generating a read-violation-exception signal when EAR is greater than RD.

3. The combination as recited in claim 2 including seventh means for storing a process ring PRN of a currently executing process, and also including eighth means connected with said seventh means, and further including ninth means connected with said eighth means for overriding said read-violation-exception signal when the effective address ring number EAR is equal to the process ring number PRN of the currently executing process.

4. In an automatic data processing apparatus for processing information, including a virtual memory having stored therein a plurality of different types of groups of information, each information group-type associated with an address space in said virtual memory bounded by a segment having adjustable bounds, said information being protected against unauthorized uses by a hierarchy of concentric ring levels (i.e. levels of privilege) wherein each group-type of information is associated with a predetermined ring number indicative of a level of privilege, said level of privilege decreasing as the associated ring number increases, an apparatus for generating an execute-violation-exception signal comprising:
  (a) first means for storing first information indicating the maximum ring number RD (i.e. minimum level of privilege) required to read information from said selected group;
  (b) second means for storing second information indicating the maximum ring number WR (i.e. minimum level of privilege) required to write information into said selected group;
  (c) third means for storing third information indicating the maximum ring number MAXR (i.e. minimum level of privilege) required to process information from said selected group;
  (d) fourth means interconnecting with said first, second and third means, for determining the maximum of the contents of said first, second and third means, whereby an effective address ring number EAR is generated;
  (e) fifth means connected with said second and third means, for comparing the maximum ring number MAXR and the write ring number WR with the effective-address-ring number EAR; and,
  (f) sixth means connected with said fifth means for generating an execute-violation-exception signal when the MAXR is not equal or greater than EAR which in turn is not equal or greater than WR.

5. In an automatic data processing apparatus for processing information, including a virtual memory having stored therein a plurality of different types of groups of information, each information group-type associated with an address space in said virtual memory bounded by a segment having adjustable bounds, said information being protected against unauthorized uses by a hierarchy of concentric ring levels (i.e. levels of privilege) wherein each group-type of information is associated with a predetermined ring number indicative of a level of privilege, said level of privilege decreasing as the associated ring number increases, an apparatus for determining the maximum effective address ring number EAR (i.e. minimum level of privilege) of a selected process to access a selected group of information comprising:
  (a) first means for storing first information indicating the maximum ring number RD (i.e. minimum level of privilege) required to read information from said selected group;
  (b) second means for storing second information indicating the maximum ring number WR (i.e. minimum level of privilege) required to write information into said selected group;
  (c) third means for storing third information indicating the maximum ring number MAXR (i.e. minimum level of privilege) required to process information from said selected group; and,
  (d) fourth means interconnecting said first, second and third means, for determining the maximum of the contents of said first, second and third means, whereby the effective address ring number EAR is generated.

6. The combination as recited in claim 5 wherein said second means additionally indicates the minimum ring number WR (i.e. maximum level of privilege) required to process information from said selected group.

7. The combination as recited in claim 5 wherein said fourth means comprises a comparator for comparing binary numbers.

8. The combination as recited in claim 5 including fifth means, connected with said second means, for comparing the effective address ring number EAR with the write ring number WR, and further including sixth means communicating with said fifth means for generating a write-violation-exception signal when EAR is greater than WR.

9. The combination as recited in claim 8 including seventh means connected, with said second and third means for comparing the maximum ring number MAXR and the write ring number WR with the effective-address-ring number EAR, and further including eighth means connected with said seventh means for generating an execute-violation-exception signal when the MAXR is not equal or greater than EAR which in turn is not equal or greater than WR.

10. The combination as recited in claim 9 including ninth means, connected with said first means, for comparing the effective address ring number EAR with the read ring number RD, and further including tenth means, connected with said ninth means, for generating a read-violation-exception signal when EAR is greater than RD.

11. The combination as recited in 10 including eleventh means for storing a process ring number PRN of a currently executing process, and also including twelfth means for connected with said eleventh means, and further including thirteenth means connected with said twelfth means for overriding said read-violation-exception signal when the effective address ring number EAR is equal to the process ring number PRN of the currently executing process.

* * * * *